US011983783B2

(12) United States Patent
Unagami et al.

(10) Patent No.: US 11,983,783 B2
(45) Date of Patent: May 14, 2024

(54) CONTROL METHOD, CONTROLLER, DATA STRUCTURE, AND POWER TRANSACTION SYSTEM

(71) Applicant: Panasonic Intellectual Property Corporation of America, Torrance, CA (US)

(72) Inventors: Yuji Unagami, Osaka (JP); Hideki Matsushima, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/206,190

(22) Filed: Jun. 6, 2023

(65) Prior Publication Data

US 2023/0316435 A1 Oct. 5, 2023

Related U.S. Application Data

(63) Continuation of application No. 17/532,110, filed on Nov. 22, 2021, which is a continuation of application (Continued)

(30) Foreign Application Priority Data

Oct. 10, 2018 (JP) .................................. 2018-191853

(51) Int. Cl.
*G06Q 50/06* (2012.01)
*G06F 1/28* (2006.01)
(Continued)

(52) U.S. Cl.
CPC .............. *G06Q 50/06* (2013.01); *G06F 1/28* (2013.01); *G06Q 20/0855* (2013.01);
(Continued)

(58) Field of Classification Search
CPC .. G06Q 50/06; G06Q 20/0855; G06Q 20/145; G06Q 20/389; H02J 13/00007;
(Continued)

(56) References Cited

U.S. PATENT DOCUMENTS 6,900,556 B2 5/2005 Provanzana
7,890,436 B2 2/2011 Kremen
(Continued)

FOREIGN PATENT DOCUMENTS

| CN | 107240002 A | 10/2017 |
| CN | 107481141 A | 12/2017 |
| WO | 2016/151316 | 9/2016 |

OTHER PUBLICATIONS

"Mizuho Industry Focus, How Digital Innovation Changes Business—exploring problems and strategies based on noteworthy effort—", Edited/Published by Mizuho Bank, Industry Research Division, vol. 57, No. 1, Sep. 28, 2017 (URL: https://www.mizuhobank.co.jp/corporate/bizinfo/industry/sangyou/m1057.html), with partial English translation.

(Continued)

*Primary Examiner* — Bennett M Sigmond
*Assistant Examiner* — Marla Hudson
(74) *Attorney, Agent, or Firm* — Wenderoth, Lind & Ponack, L.L.P.

(57) ABSTRACT

Provided is a control method including: receiving, from first power equipment, first transaction data including, for example, transmitted power amount information indicating the amount of power transmitted to power accumulation equipment; obtaining, from the power accumulation equipment, received power information including, for example, received power amount information indicating the amount of power received from the first power equipment; verifying the first transaction data by referring to the received power (Continued)

information; executing a first consensus algorithm with second servers when the first transaction data is verified successfully; and recording a block including the first transaction data in a distributed ledger of a first server when the validity of the first transaction data is verified through the first consensus algorithm.

7 Claims, 15 Drawing Sheets

Related U.S. Application Data

No. 16/287,300, filed on Feb. 27, 2019, now Pat. No. 11,210,748.

(60) Provisional application No. 62/637,441, filed on Mar. 2, 2018.

(51) Int. Cl.
| | |
|---|---|
| *G06Q 20/08* | (2012.01) |
| *G06Q 20/14* | (2012.01) |
| *G06Q 20/38* | (2012.01) |
| *G07F 15/00* | (2006.01) |
| *H02J 13/00* | (2006.01) |
| *H02J 3/38* | (2006.01) |
| *H04L 9/40* | (2022.01) |

(52) U.S. Cl.
CPC ......... *G06Q 20/145* (2013.01); *G06Q 20/389* (2013.01); *G07F 15/003* (2013.01); *H02J 13/00007* (2020.01); *H02J 3/388* (2020.01); *H04L 63/0853* (2013.01)

(58) Field of Classification Search
CPC .......... H02J 3/388; G06F 1/28; G07F 15/003; H04L 63/0853
See application file for complete search history.

(56) References Cited

U.S. PATENT DOCUMENTS

| | | |
|---|---|---|
| 2003/0160595 A1 | 8/2003 | Provanzana |
| 2008/0091580 A1 | 4/2008 | Kremen |
| 2008/0091581 A1 | 4/2008 | Kremen |
| 2008/0091590 A1 | 4/2008 | Kremen |
| 2008/0091625 A1 | 4/2008 | Kremen |
| 2008/0091626 A1 | 4/2008 | Kremen |
| 2009/0177548 A1 | 7/2009 | Eisenlohr |
| 2013/0217332 A1 | 8/2013 | Altman |
| 2017/0103468 A1 | 4/2017 | Orsini et al. |
| 2017/0358041 A1 | 12/2017 | Forbes, Jr. et al. |
| 2018/0013211 A1 | 1/2018 | Ricci |
| 2020/0134613 A1* | 4/2020 | Jiang .................. G06Q 20/3825 |

OTHER PUBLICATIONS

Extended European Search Report dated Apr. 9, 2019 in corresponding European Patent Application No. 19159581.8.
Office Action dated Nov. 22, 2023 in corresponding Chinese patent application No. 201910145430.5 and English translation of a Search Report, 13 pages.

* cited by examiner

ENTER BUYING INFORMATION

DATE

BUYING AMOUNT    kWh

UNIT PRICE    YEN

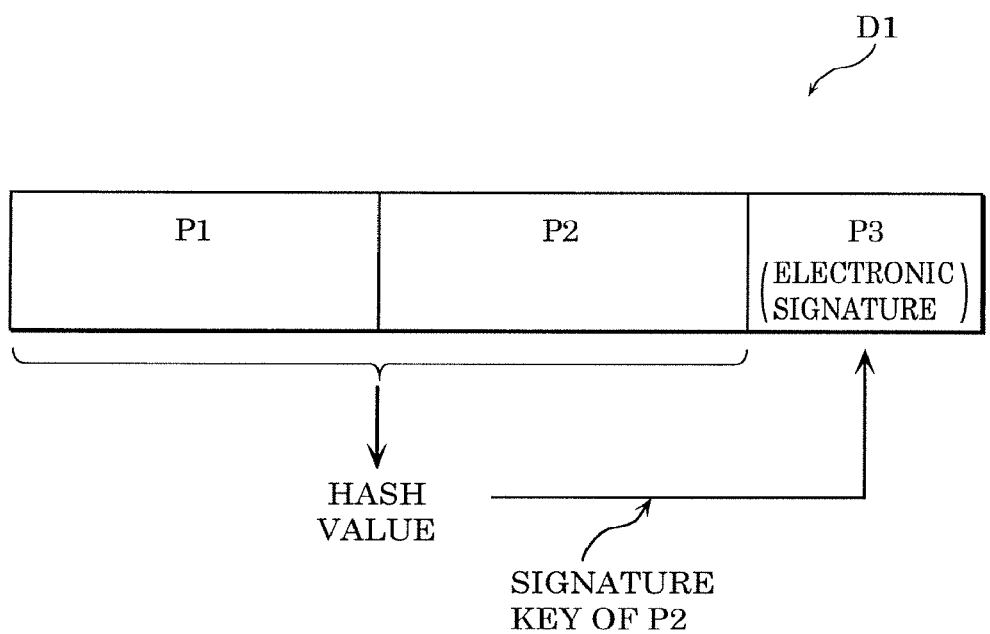

FIG. 7A

ACCUMULATION LIST

| BLOCKCHAIN ADDRESS | DATE | AMOUNT OF POWER (kWh) | SIGNATURE |
|---|---|---|---|
| 0x03547921 | 2017.12.14 13:00 | 30 | 0x76af43 … |
| 0x06587465 | 2017.12.15 10:00 | 20 | 0x80bea5 … |
| | | | |
| | | | |

FIG. 7B

BUYING REQUEST LIST

| BLOCK CHAIN ADDRESS | DATE | AMOUNT OF POWER (kWh) | UNIT PRICE (YEN) | SIGNATURE |
|---|---|---|---|---|
| 0x04587463 | 2017.12.15 13:30 | 10 | 20 | 0x2a5983··· |
| 0x08426731 | 2017.12.15 16:00 | 22 | 21 | 0x086321··· |
| | | | | |
| | | | | |

FIG. 8

| BUYING LIST | | | |
|---|---|---|---|
| BUYER ADDRESS | DATE | AMOUNT OF POWER (kWh) | UNIT PRICE (YEN) |
| 0x04587463 | 2017.12.15 13:30 | 10 | 20 |
| | | | |
| | | | |

CONTROL METHOD, CONTROLLER, DATA STRUCTURE, AND POWER TRANSACTION SYSTEM

CROSS REFERENCE TO RELATED APPLICATIONS

This application is a continuation of U.S. application Ser. No. 17/532,110 filed on Nov. 22, 2021 which is a continuation of U.S. application Ser. No. 16/287,300 filed on Feb. 27, 2019, now U.S. Pat. No. 11,210,748, which claims the benefit of priority of U.S. Provisional Application No. 62/637,441 filed on Mar. 2, 2018 and Japanese Patent Application Number 2018-191853 filed on Oct. 10, 2018, the entire contents of which are hereby incorporated by reference.

BACKGROUND

1. Technical Field

The present disclosure relates to a control method, a controller, a data structure, and a power transaction system, and in particular to a power transaction system that conducts transactions of power generated at home or the like, a control method, a controller, and a data structure in the power transaction system.

2. Description of the Related Art

Recent years have seen the spread of renewable energy such as solar photovoltaic power generated by solar photovoltaic power generation equipment. Solar photovoltaic power generation equipment not only uses self-generated power, but also sells surplus power to electric utility companies.

In the future, surplus power is assumed to be directly sold to neighbors in addition to electric utility companies (for example, see Non-Patent Literature 1: Mizuho Industry Research, *How Digital Innovation Changes Business—exploring problems and strategies based on noteworthy effort* (*Digital Innovation wa Business wo dou Henkaku suruka—chumoku no torikumi kara kadai to senryaku wo saguru*)—*Electric Power—prospects of electric power sharing economy utilizing blockchain technology* (*blockchain gijutsu wo katsuyou shita denryoku sharing economy no tenbou*), Vol. 57, No. 1, 2017, URL: https://www.mizuho-bank.co.jp/corporate/bizinfo/industry/sangyou/m1057.html). Non-Patent Literature 1 studies a technique for configuring autonomous distributed systems by utilizing blockchain technology for power transactions between individuals in the electric power field. For example, when a user of a home having solar photovoltaic power generation equipment wants to sell surplus power to another user, a sales contract can be made using blockchain.

According to Non-Patent Literature 1, if the home of the user who wants to sell surplus power can accumulate power generated, the accumulated power can be sold directly to another user. That is to say, power transactions can be conducted between individuals without an electric utility company or the like serving as an agent. On the other hand, if the home of the user who wants to sell surplus power cannot accumulate power generated, power transactions between individuals require intermediation of an agent having power accumulation equipment.

SUMMARY

However, when the power transactions between individuals are put into the hands of the agent having power accumulation equipment, the agent may buy power at a price unreasonably cheaper than the average asking price or sell the power at a unit price unreasonably higher than the price at which the agent bought the power. In other words, when the power transactions between individuals are put into the hands of the agent having power accumulation equipment, the power transactions may be subject to fraudulent intermediation by the agent.

In view of the above circumstances, the present disclosure has an object to provide a control method and the related technologies that can reduce fraudulent power transactions.

In order to achieve the above object, a control method according to the present disclosure is a control method performed in a power transaction system that includes: first power equipment used by a first user; power accumulation equipment connected to the first power equipment via a power line; and a plurality of servers with which the first power equipment and the power accumulation equipment are capable of communicating via a network. The control method is performed by a first server among the plurality of servers, and includes: receiving first transaction data from the first power equipment via the network, the first transaction data including (i) transmitted power amount information indicating an amount of transmitted power transmitted by the first power equipment to the power accumulation equipment via the power line, and (ii) an electronic signature of the first user; obtaining received power information including received power amount information from the power accumulation equipment via the network, the received power amount information indicating an amount of received power received by the power accumulation equipment from the first power equipment; verifying the first transaction data by referring to the received power information; transferring the first transaction data to a plurality of second servers among the plurality of servers not including the first server when (i) the electronic signature of the first user and (ii) validity of the first transaction data are verified successfully in verifying the first transaction data; executing a first consensus algorithm with the plurality of second servers for reaching a consensus on the validity of the first transaction data; and recording a block including the first transaction data in a distributed ledger of the first server when the consensus on the validity of the first transaction data is reached through the first consensus algorithm.

Note that the above general or specific aspect may be realized by a system, an integrated circuit, a computer program, or a computer-readable recording medium such as a CD-ROM (compact disc read only memory), or by any combination of systems, methods, integrated circuits, computer programs, and recording media.

A control method and the related technologies according to the present disclosure can reduce fraudulent power transactions.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 illustrates an example of an overall configuration of a power transaction system according to an embodiment;

FIG. 2 illustrates an example of an overall configuration of a home according to the embodiment;

FIG. 3 is a block diagram illustrating a functional configuration of a controller illustrated in FIG. 2;

FIG. 4 illustrates an example of a data entry screen for entering buying request information according to the embodiment;

FIG. 6B is an explanatory diagram illustrating a data structure of transaction data;

FIG. 7A illustrates an example of an accumulation list according to the embodiment;

FIG. 7B illustrates an example of a buying request list according to the embodiment;

FIG. 8 illustrates an example of a buying list according to the embodiment;

DETAILED DESCRIPTION OF THE EMBODIMENT

Figure 1:
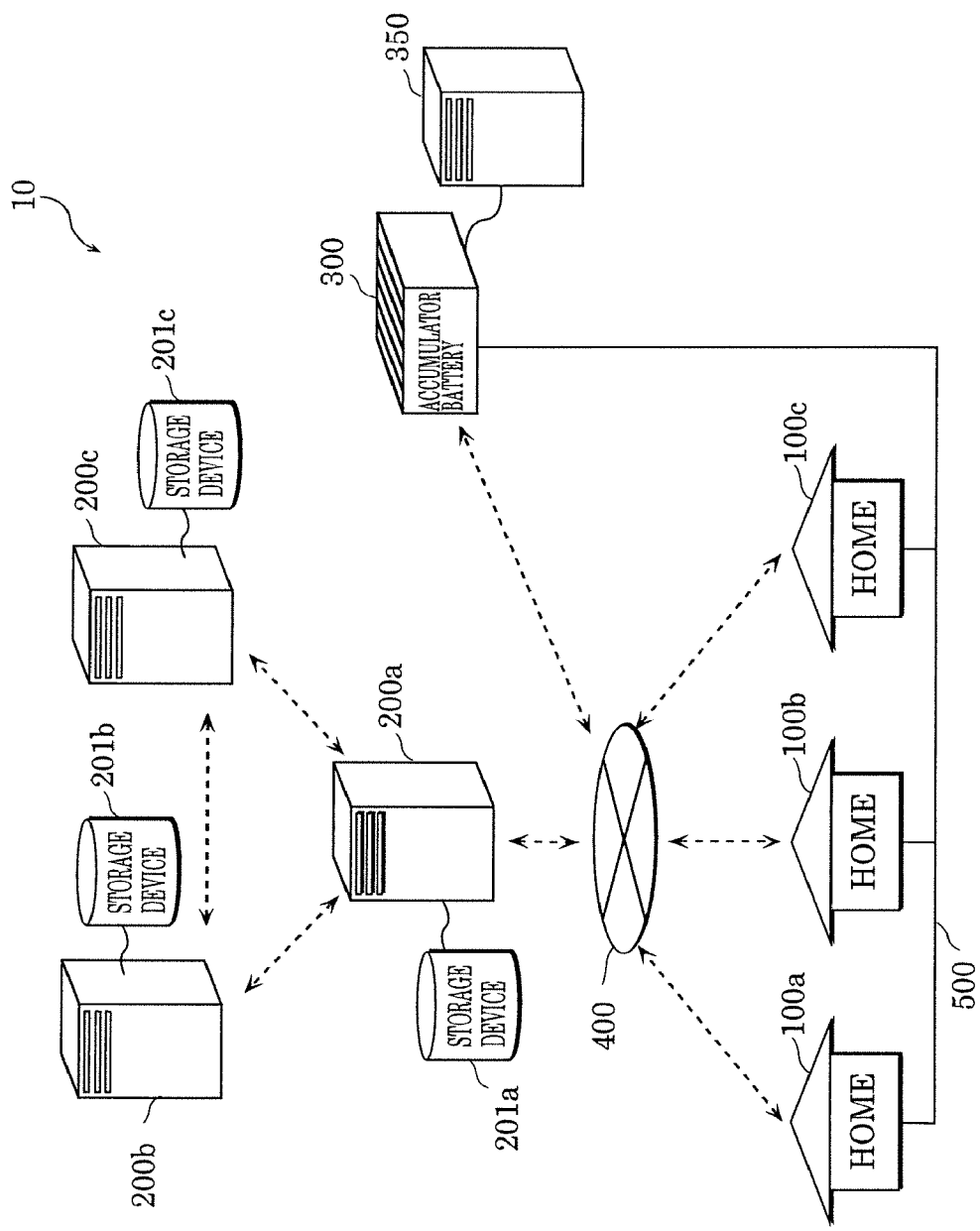

A control method according to an aspect of the present disclosure is a control method performed in a power transaction system that includes: first power equipment used by a first user; power accumulation equipment connected to the first power equipment via a power line; and a plurality of servers with which the first power equipment and the power accumulation equipment are capable of communicating via a network. The control method is performed by a first server among the plurality of servers, and includes: receiving first transaction data from the first power equipment via the network, the first transaction data including (i) transmitted power amount information indicating an amount of transmitted power transmitted by the first power equipment to the power accumulation equipment via the power line, and (ii) an electronic signature of the first user; obtaining received power information including received power amount information from the power accumulation equipment via the network, the received power amount information indicating an amount of received power received by the power accumulation equipment from the first power equipment; verifying the first transaction data by referring to the received power information; transferring the first transaction data to a plurality of second servers among the plurality of servers not including the first server when (i) the electronic signature of the first user and (ii) validity of the first transaction data are verified successfully in verifying the first transaction data; executing a first consensus algorithm with the plurality of second servers for reaching a consensus on the validity of the first transaction data; and recording a block including the first transaction data in a distributed ledger of the first server when the consensus on the validity of the first transaction data is reached through the first consensus algorithm.

In such a manner, transaction data indicating a transaction of power transmitted to the electric power accumulation equipment is recorded in the distributed ledger. This makes public the transaction data indicating a power transaction, and makes tampering detectable. Accordingly, it is possible to reduce fraudulent power transactions by a service provider having an accumulator battery.

Verifying the first transaction data may include: comparing the transmitted power amount information and the received power amount information; verifying the electronic signature of the first user; and verifying the validity of the first transaction data.

With this, tampering can be detected since it is possible to verify, for example, the consistency between power transmitted to the power accumulation equipment and power received by the power accumulation equipment and the validity of the first transaction data.

The first transaction data may further include a first time stamp indicating a first date and time of transmission of the transmitted power. The received power information may further include a second time stamp indicating a second date and time of reception of the received power. Comparing the transmitted power amount information and the received power amount information may further include comparing the first time stamp and the second time stamp.

The power transaction system may further include second power equipment used by a second user, connected to the power accumulation equipment via the power line, and capable of communicating with the plurality of servers via the network. The control method may further include: receiving second transaction data from the second power equipment via the network, the second transaction data including (i) buying amount information indicating an amount of power that the second user wants to buy, and (ii) an electronic signature of the second user; verifying the second transaction data received; transferring the second transaction data to the plurality of second servers when (i) the electronic signature of the second user and (ii) validity of the second transaction data are verified successfully in verifying the second transaction data; executing a second consensus algorithm with the plurality of second servers for reaching a consensus on the validity of the second transaction data; and recording a block including the second transaction data in the distributed ledger of the first server when the consensus on the validity of the second transaction data is reached through the second consensus algorithm.

In such a manner, the second transaction data for a blockchain indicating a power buying request is recorded in the distributed ledger. This makes public the transaction data indicating a power transaction, and makes tampering detectable. Accordingly, it is possible to reduce fraudulent power transactions by a service provider having an accumulator battery.

The control method may further include: obtaining accumulated power information from the power accumulation equipment via the network, the accumulated power information including accumulated power amount information indicating an amount of accumulated power held by the power accumulation equipment; determining whether or not power is transmittable from the power accumulation equipment to the second power equipment by comparing the buying amount information and the accumulated power amount information; requesting the power accumulation equipment to transmit power to the second power equipment when power is transmittable from the power accumulation equipment to the second power equipment via the power line; generating third transaction data indicating a transaction matching result indicating transmission of accumulated power from the power accumulation equipment to the second power equipment; transferring the third transaction data to the plurality of second servers; executing a third consensus algorithm with the plurality of second servers for reaching a consensus on validity of the third transaction data; and recording a block including the third transaction data in the distributed ledger of the first server when the consensus on the validity of the third transaction data is reached through the third consensus algorithm.

In such a manner, the third transaction data for the blockchain indicating a power transaction matching result related to a power transaction conducted via an accumulator battery is recorded in the distributed ledger. This makes public the transaction data indicating a power transaction, and makes tampering detectable. Accordingly, it is possible to reduce fraudulent power transactions by a service provider having an accumulator battery.

Requesting the power accumulation equipment to transmit power to the second power equipment may include: generating fourth transaction data indicating a transaction matching result indicating that the power accumulation equipment has been requested to transmit accumulated power to the second power equipment; transferring the fourth transaction data to the plurality of second servers; executing a fourth consensus algorithm with the plurality of second servers for reaching a consensus on validity of the fourth transaction data; and recording a block including the fourth transaction data in the distributed ledger of the first server when the consensus on the validity of the fourth transaction data is reached through the fourth consensus algorithm, and the third transaction data further includes information indicating that the power accumulation equipment has transmitted the accumulated power to the second power equipment.

The first power equipment and the second power equipment may include at least one of a solar photovoltaic power generation apparatus, a gas power generation apparatus, and a wind power generation apparatus.

Executing the second consensus algorithm may include: receiving a second report from each of the plurality of second servers indicating whether or not the validity of the second transaction data is verified successfully; determining whether or not a total number of second reports indicating that the validity of the second transaction data is verified successfully exceeds a predetermined number; and determining that the consensus on the validity of the second transaction data is reached through the second consensus algorithm when the total number of second reports indicating that the validity of the second transaction data is verified successfully exceeds the predetermined number.

Executing the first consensus algorithm may include: receiving a first report from each of the plurality of second servers indicating whether or not the validity of the first transaction data is verified successfully; determining whether or not a total number of first reports indicating that the validity of the first transaction data is verified successfully exceeds a predetermined number; and determining that the consensus on the validity of the first transaction data is reached through the first consensus algorithm when the total number of first reports indicating that the validity of the first transaction data is verified successfully exceeds the predetermined number.

The control method may further include: transmitting a notification after recording the block including the first transaction data in the distributed ledger and after the first server pays an incentive to the first user, the notification indicating that the incentive has been paid.

A controller according to an aspect of the present disclosure is a controller in a power transaction system that includes: first power equipment used by a first user; power accumulation equipment connectable to the first power equipment via a power line; and a plurality of servers with which the first power equipment and the power accumulation equipment are capable of communicating via a network. The controller controls the first power equipment, and includes: a processor; and memory having a program stored therein for causing the processor to execute predetermined processing. The predetermined processing includes: determining whether or not an amount of surplus power of the first power equipment is greater than or equal to a predetermined value; causing the first power equipment to transmit at least a portion of the surplus power to the power accumulation equipment as transmitted power via the power line when the amount of the surplus power is greater than or equal to the predetermined value; generating first transaction data including (i) transmitted power amount information indicating an amount of the transmitted power and (ii) an electronic signature of the first user; transmitting the first transaction data to a first server among the plurality of servers via the network; causing a display to display value information indicating a value to be paid to the first user for the amount of the transmitted power, when validity of the first transaction data is verified by the plurality of servers and a block including the first transaction data is recorded in each of distributed ledgers of the plurality of servers; and causing the display to display failure information when the validity of the first transaction data is not verified by the plurality of servers, the failure information indicating that the validity of the first transaction data is not verified.

A control method of controlling a display according to an aspect of the present disclosure is a control method of controlling a display for a power transaction system that includes: first power equipment used by a first user; power accumulation equipment connected to the first power equipment via a power line; and a plurality of servers with which the first power equipment and the power accumulation equipment are capable of communicating via a network. The display displays information on a power transaction of the first power equipment. The control method includes: causing the display to display transmitted power information indicating that at least a portion of surplus power of the first power equipment has been transmitted to the power accumulation equipment as transmitted power via the power line when an amount of the surplus power is greater than or equal to a predetermined value; causing the display to display verification-in-progress information during a time period from when first transaction data is transmitted to a first server among the plurality of servers to when validity of the first transaction data is verified by the plurality of servers, the verification-in-progress information indicating that the validity of the first transaction data is currently being verified, the first transaction data including (i) transmitted power amount information indicating an amount of the transmitted power and (ii) an electronic signature of the first user; causing the display to display value information indicating a value paid to the first user for the amount of the transmitted power, when the validity of the first transaction data is verified by the plurality of servers; and causing the display to display failure information when a consensus on the validity of the first transaction data is not reached by the plurality of servers, the failure information indicating that the consensus on the validity of the first transaction data is not reached.

A data structure according to an aspect of the present disclosure is a data structure used for a block recorded in a blockchain in a power transaction system that includes: first power equipment used by a first user; power accumulation equipment connected to the first power equipment via a power line; and a plurality of servers with which the first power equipment and the power accumulation equipment are capable of communicating via a network. The data structure includes: a blockchain address that is an identifier for identifying at least one of the first user and the first power equipment, the blockchain address being included in the block of the blockchain and generated using a secret key of the first user; transmitted power amount information indicating an amount of transmitted power transmitted by the first power equipment to the power accumulation equipment; and an electronic signature of the first user. The transmitted power amount information is used for verification of validity of a transaction related to transmission of the transmitted power from the first power equipment to the power accumulation equipment, by being compared with received power amount information indicating an amount of received power received by the power accumulation equipment from the first power equipment.

A power transaction system according to an aspect of the present disclosure is a power transaction system including: first power equipment used by a first user and including a first controller; power accumulation equipment connected to the first power equipment via a power line and including a second controller; and a plurality of servers communicably connected to the first power equipment and the power accumulation equipment via a network. The first controller included in the first power equipment: causes the first power equipment to transmit at least a portion of surplus power of the first power equipment to the power accumulation equipment as transmitted power via the power line; generates first transaction data including (i) transmitted power amount information indicating an amount of the transmitted power and (ii) an electronic signature of the first user; and transmits the first transaction data to a first server among the plurality of servers via the network. The second controller included in the power accumulation equipment stores received power information including received power amount information in a storage device, the received power amount information indicating an amount of received power received by the power accumulation equipment from the first power equipment. The first server: obtains the received power information from the power accumulation equipment via the network; verifies the first transaction data by referring to the received power information; and transfers the first transaction data to a plurality of second servers among the plurality of servers not including the first server when (i) the electronic signature of the first user and (ii) validity of the first transaction data are verified successfully in verification of the first transaction data. The first server and the plurality of second servers: execute a first consensus algorithm related to the first transaction data; and record a block including the first transaction data in a distributed ledger of the first server when the validity of the first transaction data is verified successfully through the first consensus algorithm.

The following describes an exemplary embodiment with reference to the drawings. Note that the following embodiment shows a specific example of the present disclosure. That is to say, the numerical values, shapes, materials, structural elements, the arrangement and connection of the structural elements, steps, the processing order of the steps etc. illustrated in the following embodiment are mere examples, and are not intended to limit the present disclosure. The present disclosure is specified based on the claims. Accordingly, among the structural elements in the following exemplary embodiment, those not recited in any of the independent claims representing the most generic concepts of the present disclosure are not necessarily essential to achieving the object of the present disclosure, and will be described as structural elements being part of the exemplary embodiment.

EMBODIMENT

First, the following describes a system configuration according to the present disclosure.

[1. System Configuration]

A power transaction system according to the present disclosure reduces fraudulent power transactions by conducting power transactions using blockchain technology, e.g., by recording, in a distributed ledger, transaction data of a power transaction conducted via, as an agent, a service provider having an accumulator battery.

The following describes the power transaction system and the related technologies according to the embodiment with reference to the drawings.

[1.1 Overall Configuration of Power Transaction System 10]

FIG. 1 illustrates an example of the overall configuration of power transaction system 10 according to the present embodiment.

As illustrated in FIG. 1, power transaction system 10 includes, for example: homes 100a, 100b, and 100c, authentication servers 200a, 200b, and 200c, accumulator battery 300, and management server 350 that manages accumulator battery 300. These elements are connected via communication network 400. Homes 100a, 100b, and 100c and accumulator battery 300 are connected via power network 500. Power network 500 is an example of a power line, and is a network that enables buying and selling of power between homes. Power network 500 may be an exclusive line, or may be a power network provided by an electric utility company.

Authentication servers 200a, 200b, and 200c (hereinafter also referred to as authentication server 200a etc.) are connected with storage devices 201a, 201b, and 201c, respectively. Authentication server 200a etc. may be connected with storage device 201a etc. via communication network 400, or may internally include storage device 201a etc. Storage device 201a includes a distributed ledger for electronically recording a blockchain composed of transaction data blocks.

Note that FIG. 1 illustrates an example in which power transaction system 10 includes three homes and three authentication servers, but power transaction system 10 is not limited to this example. In other words, power transaction system 10 may include four or more homes and four or more authentication servers.

[1.2 Configuration of Home 100a]

Homes 100b and 100c have the same configuration as home 100a, and thus home 100a is taken as an example in the following description.

Figure 2:
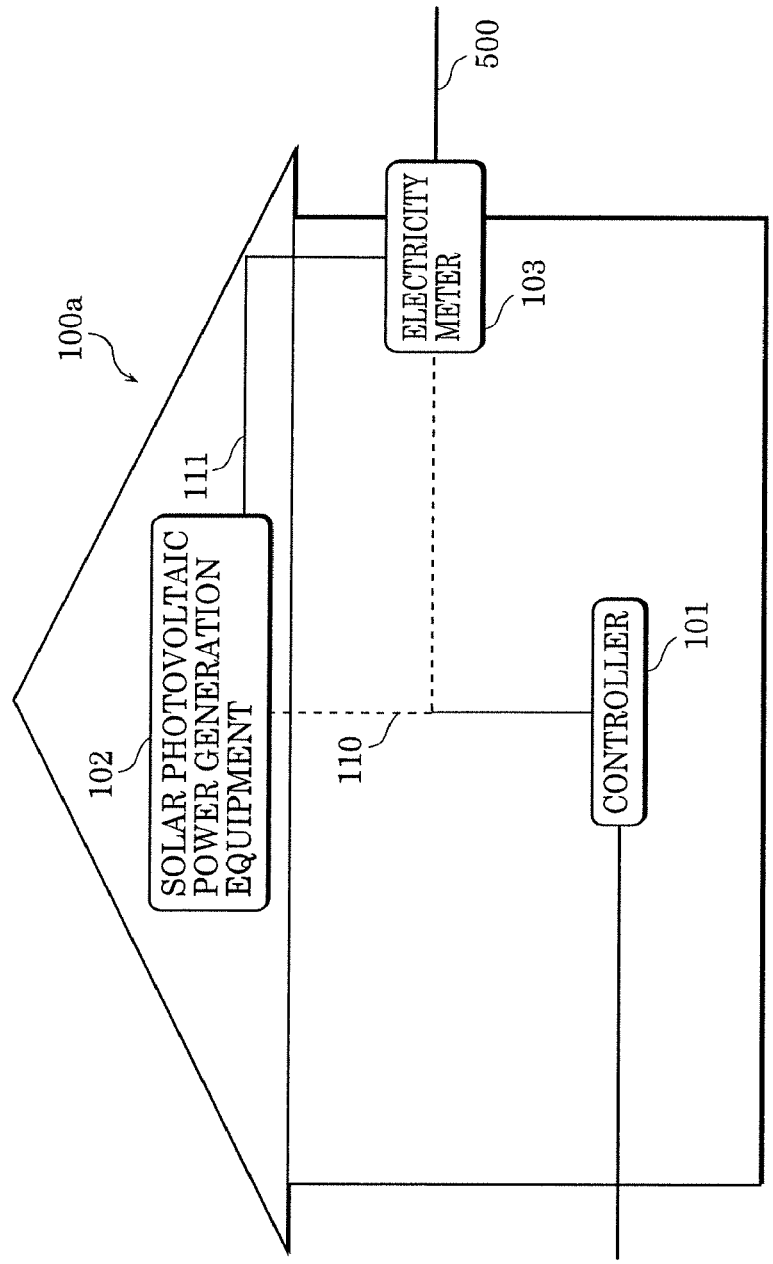

FIG. 2 illustrates an example of the overall configuration of home 100a according to the present embodiment.

As illustrated in FIG. 2, home 100a includes: controller 101; solar photovoltaic power generation equipment 102; and electricity meter 103. Controller 101, solar photovoltaic power generation equipment 102, and electricity meter 103 are connected via communication network 110. Solar photovoltaic power generation equipment 102 and electricity meter 103 are connected via power network 111, and are connected to power network 500 outside home 100a via electricity meter 103.

Here, home 100a etc. are an example of buildings having power equipment used by either a first user or a second user, and are, for example, residential houses. Home 100a etc., however, are not limited to residential houses. Home 100a etc. may be buildings such as factories. In other words, home 100a etc. may be any buildings, so long as they have power equipment used by a user.

<Controller 101>

Controller 101 is, for example, a controller for an energy management system, and is an example of a controller that controls either first power equipment or second power equipment included in power transaction system 10.

In the present embodiment, controller 101 displays a power generation state of solar photovoltaic power generation equipment 102, and receives a request for buying or selling of power, for example. Controller 101 controls solar photovoltaic power generation equipment 102 so that solar photovoltaic power generation equipment 102 transmits power to either power network 111 or power network 500. Controller 101 manages the amount of power transmitted, and transmits a notification to authentication server 200a etc. The details will be described later.

<Solar Photovoltaic Power Generation Equipment 102>

Solar photovoltaic power generation equipment 102 is an example of a solar photovoltaic power generation apparatus included in either the first power equipment or the second power equipment. Solar photovoltaic power generation equipment 102 is an apparatus having a power generation mechanism for directly converting solar light to power using solar battery. Solar photovoltaic power generation equipment 102 uses the generated power at home 100a, and also transmits the generated power to power network 500 via power network 111.

Note that solar photovoltaic power generation equipment 102 is not limited to a solar photovoltaic power generation apparatus, and may be, for example, a gas power generation apparatus, a wind power generation apparatus, or the like.

<Electricity Meter 103>

Electricity meter 103 is included in either the first power equipment or the second power equipment, and measures the amount of power transmitted to or received from power network 500. When solar photovoltaic power generation equipment 102 transmits power to power network 500 according to an instruction from controller 101 to transmit power, electricity meter 103 measures the time at which the power is transmitted and the amount of the power transmitted, and notifies controller 101 of the time and amount measured. Electricity meter 103 measures the amount of power received from power network 500 and used according to an instruction from controller 101 to use power. Note that electricity meter 103 may be included in controller 101.

The following describes an example of the configuration of controller 101.

[1.3 Configuration of Controller 101]

Figure 3:
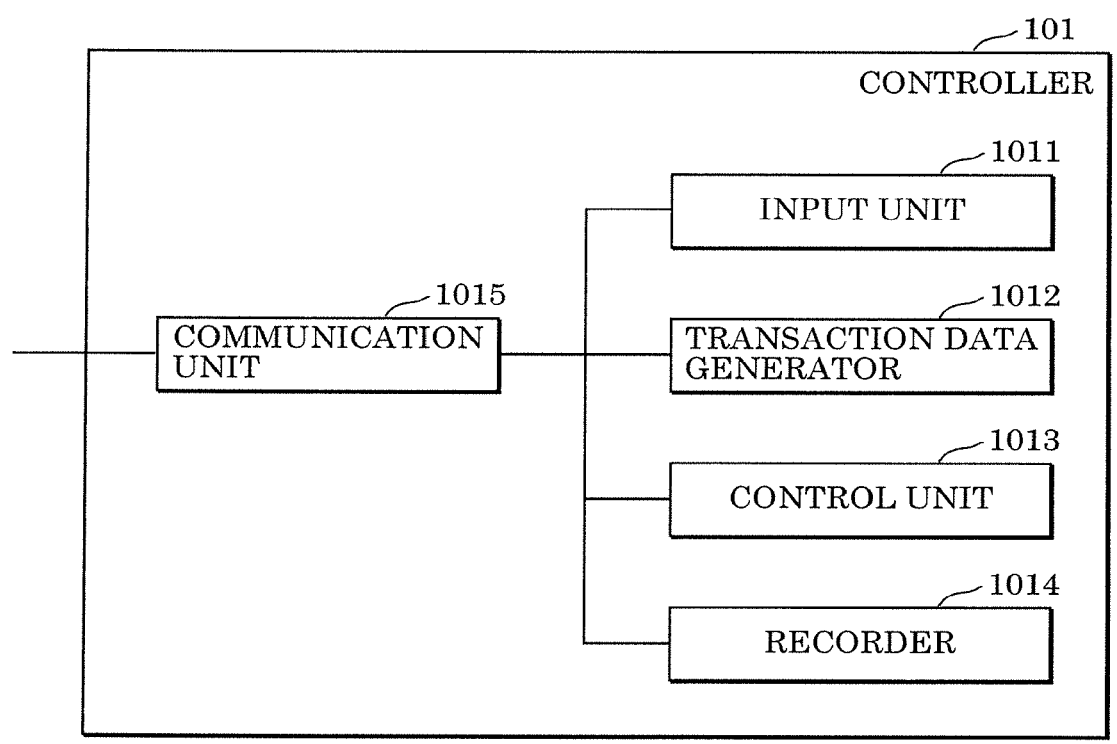

FIG. 3 is a block diagram illustrating a functional configuration of controller 101 illustrated in FIG. 2.

Controller 101 includes a processor and memory having a program stored therein for causing the processor to execute predetermined processing. In other words, controller 101 is realized as a result of the processor executing a given program using the memory. In the present embodiment, controller 101 includes input unit 1011, transaction data generator 1012, control unit 1013, recorder 1014, and communication unit 1015. Hereinafter, each structural element will be described.

<Input unit 1011>

Input unit 1011 generates a data entry screen on which the user enters information (buying request information) indicating a request for buying power (buying request) or information (selling request information) indicating a request for selling power (selling request). When the user enters the buying request information or the selling request information on the data entry screen generated, input unit 1011 transmits the buying request information or the selling request information to transaction data generator 1012.

FIG. 4 illustrates an example of the data entry screen for entering the buying request information according to the present embodiment. As illustrated in FIG. 4, for example, the user enters a date, the amount of power the user wants to buy (buying amount), and the unit price for buying power into data entry screen 1011a for entering the buying request information. In the example illustrated in FIG. 4, the buying amount is displayed in kWh, but the buying amount is not limited to this example. The buying amount may be represented as a ratio to the power generated by solar photovoltaic power generation equipment 102. The buying amount and the unit price for buying power need not be entered by the user, and may be determined by power transaction system 10 in advance. In the case where the user sets the unit price for buying power, the user can be given priority in buying power by paying more than the market price. Note that input unit 1011 may indicate default data for the date, buying amount, and unit price for buying power on data entry screen 1011a, and prompt the user to enter, for example, "approve" or "disapprove" to accept or not accept the default data.

<Transaction Data Generator 1012>

Transaction data generator 1012 generates transaction data in the blockchain based on either the buying request information or the selling request information received from input unit 1011. Note that transaction data generator 1012 may determine whether or not the amount of surplus power of solar photovoltaic power generation equipment 102 is greater than or equal to a predetermined value, and generate transaction data when the amount of surplus power is greater than or equal to the predetermined value. Here, the amount of surplus power is greater than or equal to the predetermined value when, for example, the amount of surplus power is greater than or equal to the amount of power the user wants to sell (selling amount) included in the selling request information received from input unit 1011.

The transaction data generated by transaction data generator 1012 is an example of first transaction data and second transaction data.

The first transaction data includes (i) transmitted power amount information indicating the amount of transmitted power transmitted by the first power equipment to power accumulation equipment via a power line and (ii) an electronic signature of the first user. The first transaction data further includes (iii) a first blockchain address, that is an identifier for identifying at least one of the first user and the first power equipment and (iv) a first time stamp indicating a first date and time of transmission of the transmitted power. It is not essential for the first transaction data to include the first time stamp. There may be two or more types of first blockchain address, so long as each functions as an identifier for identifying at least one of the first user and the first power equipment. Including one of them in the first transaction data is sufficient.

The second transaction data includes (i) buying amount information indicating the amount of power that the second user wants to buy and (ii) an electronic signature of the second user. The second transaction data further includes (iii) a second blockchain address, that is an identifier for identifying at least one of the second user and the second power equipment. As with the first blockchain address, there may also be two or more types of second blockchain address, so long as each functions as an identifier for identifying at least one of the second user and the second power equipment. Including one of them in the second transaction data is sufficient.

As described above, the transaction data generated by transaction data generator 1012 includes the blockchain address of the user or controller 101, either the selling request information or the buying request information, and the user's signature.

Transaction data generator 1012 records the generated transaction data in recorder 1014. Transaction data generator 1012 transmits the generated transaction data to at least one of authentication servers 200a etc. via communication unit 1015. When transaction data generator 1012 receives a notification from electricity meter 103 indicating that power has been transmitted to power network 500, transaction data generator 1012 generates transaction data including the amount of power transmitted and the time included in the notification, and records the transaction data in recorder 1014. Transaction data generator 1012 transmits the generated transaction data to at least one of authentication servers 200a etc. via communication unit 1015.

<Control Unit 1013>

When the amount of surplus power of the first power equipment is greater than or equal to a predetermined value, control unit 1013 causes the first power equipment to transmit at least a portion of the amount of surplus power to the power accumulation equipment as transmitted power via the power line. For example, when performing control to cause transmission of power, control unit 1013 transmits an instruction to solar photovoltaic power generation equipment 102 to transmit the power generated by solar photovoltaic power generation equipment 102 to power network 500. When performing control to cause use of power, control unit 1013 uses power bought via power network 500.

Control unit 1013 may cause a display included in or connected to controller 101 to display, for example, either the buying request information or the selling request information transmitted to authentication server 200a etc.

Moreover, control unit 1013 may cause the display to display transmitted power information indicating that at least a portion of the surplus power has been transmitted to the power accumulation equipment as transmitted power via the power line. During a time period from when the first transaction data is transmitted to a first server among the plurality of authentication servers 200a etc. to when the validity of the first transaction data is verified by the plurality of authentication servers 200a etc., control unit 1013 may cause the display to display verification-in-progress information indicating that the validity of the first transaction data is currently being verified.

When the validity of the first transaction data is verified by the plurality of authentication servers 200a etc., control unit 1013 may cause the display to display value information indicating a value to be paid to the user for the amount of the transmitted power. On the other hand, when the validity of the first transaction data is not verified by the plurality of authentication servers 200a etc., control unit 1013 may cause the display to display failure information indicating that the validity of the first transaction data is not verified.

<Recorder 1014>

Recorder 1014 records the transaction data generated by transaction data generator 1012. In the present embodiment, recorder 1014 records either the first transaction data or the second transaction data generated by transaction data generator 1012.

<Communication Unit 1015>

Communication unit 1015 communicates with management server 350 and authentication server 200a etc. via communication network 400. The communication may be performed in accordance with transport layer security (TLS). In this case, communication unit 1015 may hold an encryption key for the TLS communication.

In the present embodiment, communication unit 1015 transmits either the first transaction data or the second transaction data to the first server among the plurality of authentication servers 200a etc. via communication network 400.

Next, authentication server 200a etc. will be described.

[1.4 Configuration of Authentication Server 200a]

Figure 5:
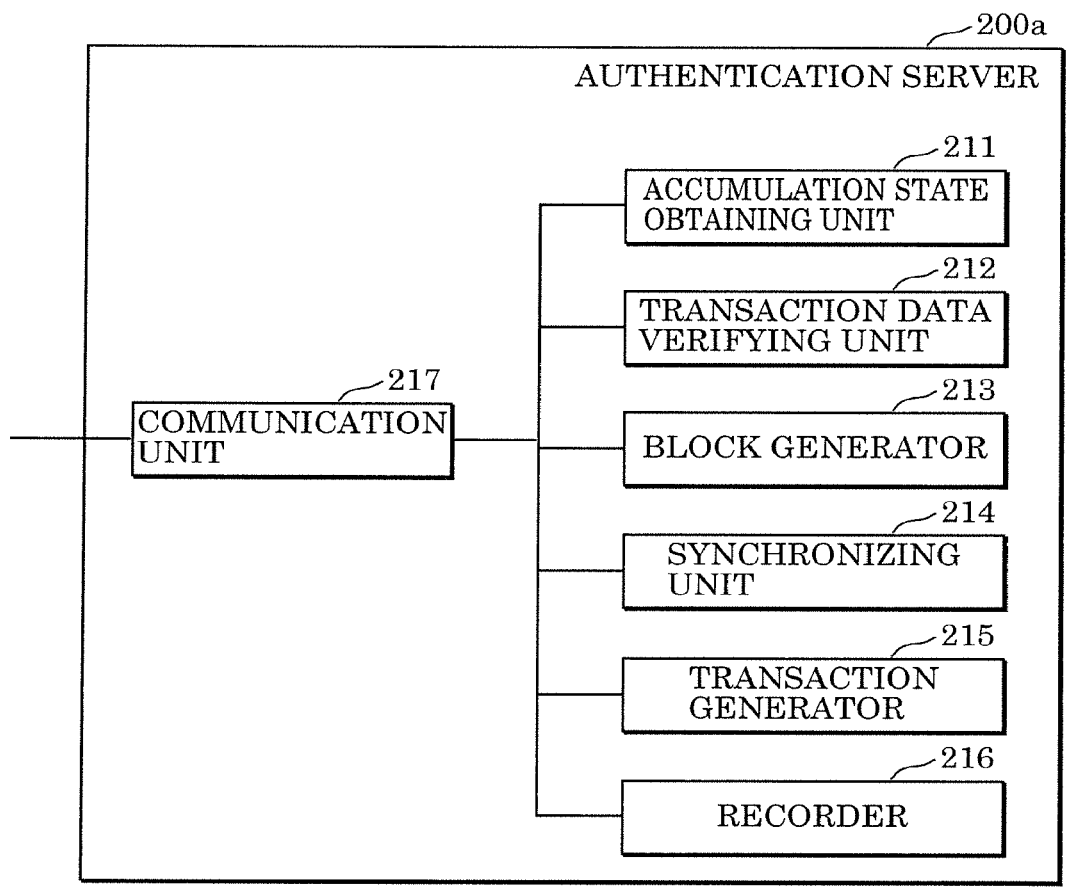
FIG. 5 is a block diagram illustrating a functional configuration of an authentication server according to the embodiment.

FIG. 5 is a block diagram illustrating a functional configuration of authentication server 200a according to the present embodiment. Authentication servers 200b and 200c have the same configuration as authentication server 200a, and thus authentication server 200a is taken as an example in the following description.

As illustrated in FIG. 5, authentication server 200a includes accumulation state obtaining unit 211, transaction data verifying unit 212, block generator 213, synchronizing unit 214, transaction generator 215, recorder 216, and communication unit 217. Authentication server 200a can be realized as a result of a processor executing a given program using memory. Hereinafter, each structural element will be described.

<Accumulation State Obtaining Unit 211>

Accumulation state obtaining unit 211 obtains, from the power accumulation equipment via communication network 400, received power information including received power amount information indicating the amount of received power received by the power accumulation equipment from the first power equipment. Accumulation state obtaining unit 211 also obtains, from the power accumulation equipment via communication network 400, accumulated power information including accumulated power amount information indicating the amount of power held by the power accumulation equipment. Note that accumulation state obtaining unit 211 may obtain, from the power accumulation equipment via communication network 400, received power information including (i) the received power amount information indicating the amount of received power received by the power accumulation equipment from the first power equipment and (ii) a second time stamp indicating a second date and time of reception of the received power.

In such a manner as described, accumulation state obtaining unit 211 obtains the received power information and the accumulated power information as information indicating an accumulation state of accumulator battery 300 so as to ensure that power is certainly accumulated in accumulator battery 300. Accumulation state obtaining unit 211 then transmits the obtained information indicating the accumulation state of accumulator battery 300 to transaction data verifying unit 212 and transaction generator 215.

<Transaction Data Verifying Unit 212>

When transaction data verifying unit 212 receives the first transaction data, transaction data verifying unit 212 verifies the validity of the first transaction data by referring to the received power information. More specifically, transaction data verifying unit 212 compares the transmitted power amount information and the received power amount information by referring to the received power information so as to ensure that the transmitted power has been certainly accumulated in accumulator battery 300. After ensuring that the transmitted power has been certainly accumulated in accumulator battery 300, transaction data verifying unit 212 verifies the electronic signature of the first user and verifies the validity of the first transaction data. Note that there are cases where the first transaction data includes the first time stamp and the received power information includes the second time stamp. In such cases, transaction data verifying unit 212 may compare the transmitted power amount information and the received power amount information by referring to the received power information so as to ensure that the transmitted power has been certainly accumulated in accumulator battery 300. The use of the first time stamp and the second time stamp enables transaction data verifying unit 212 to ensure that power has been transmitted to the accumulator battery and also ensure that the power has been transmitted and received at the same time.

When transaction data verifying unit 212 receives the second transaction data, transaction data verifying unit 212 verifies the second transaction data. More specifically, transaction data verifying unit 212 verifies the electronic signature of the second user included in the second transaction data and verifies the validity of the second transaction data.

In such a manner as described, transaction data verifying unit 212 verifies the transaction data received. More specifically, when transaction data verifying unit 212 receives the transaction data from home 100a etc., transaction data verifying unit 212 verifies whether (i) the blockchain address, (ii) selling request information or buying request information, (iii) power information, which are included in the transaction data, are valid. If the result of the verification shows that the transaction data is valid, transaction data verifying unit 212 records the transaction data in recorder 216.

To verify whether the power information is valid, transaction data verifying unit 212 verifies whether or not power is properly transmitted or used, by referring to the information obtained by accumulation state obtaining unit 211 and indicating the accumulation state of accumulator battery 300. If the result of the verification shows that the transaction data is valid, transaction data verifying unit 212 transmits the transaction data to synchronizing unit 214.

<Block Generator 213>

When the validity of the transaction data is verified successfully by transaction data verifying unit 212, block generator 213 executes a consensus algorithm related to the transaction data with the other authentication servers 200b and 200c that are second servers not including the first server. The consensus algorithm here means any one of first to third consensus algorithms, and the transaction data here means any one of the first to third transaction data.

In such a manner as described, block generator 213 executes a consensus algorithm among the plurality of authentication servers. The consensus algorithm may be a consensus algorithm called practical byzantine fault tolerance (PBFT), or any other publicly known consensus algorithm. In the case of using PBFT, block generator 213 first receives a report from each of the other authentication servers 200b and 200c indicating whether or not the transaction data is verified successfully, and determines whether or not a total number of reports indicating that the transaction data is verified successfully exceeds a predetermined number. When the total number of reports indicating that the transaction data is verified successfully exceeds the predetermined number, block generator 213 may determine that the validity of the transaction data is verified through the consensus algorithm.

When the validity of the transaction data is verified through the consensus algorithm, block generator 213 records a block including the transaction data in the distributed ledger included in storage device 201a of authentication server 200a.

In such a manner as described, in the present embodiment, block generator 213 executes the consensus algorithm among authentication servers 200a, 200b, and 200c. Specifically, block generator 213 first generates a block of a blockchain including one or more pieces of transaction data. Next, block generator 213 executes the consensus algorithm. If a consensus is reached through the execution of the consensus algorithm, block generator 213 records the generated block in recorder 216. The block generated by block generator 213 is recorded by being connected to the blockchain recorded in recorder 216.

Here, a data structure of the blockchain and a data structure of the transaction data will be described.

Figure 6A:
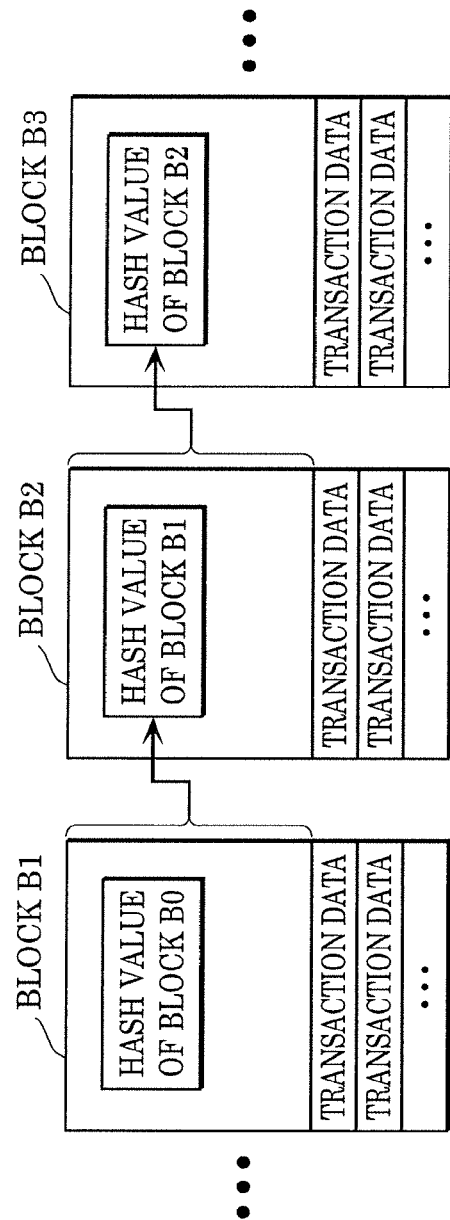
FIG. 6A is an explanatory diagram illustrating a data structure of a blockchain.

FIG. 6A is an explanatory diagram illustrating the data structure of the blockchain.

The blockchain is a chain of blocks each of which is the unit of recording. Each block includes a plurality of pieces of transaction data and a hash value of the immediately preceding block. Specifically, block B2 includes a hash value of the preceding block B1. A hash value calculated based on (i) a plurality of pieces of transaction data included in block B2 and (ii) the hash value of block B1 is included in block B3 as the hash value of block B2. Connecting blocks like a chain while including the content of the preceding block as a hash value in such a manner effectively prevents tampering with the transaction data included in the connected blocks.

If the past transaction data stored in a block of the blockchain is modified, the hash value of the block changes from the hash value before the modification. To make the tampered block look genuine, all the subsequent blocks must be remade, which is very difficult in reality.

In the present embodiment, each piece of transaction data is: first transaction data indicating a selling request; second transaction data indicating a buying request; or third or fourth transaction data indicating a transaction matching result which will be described later.

FIG. 6B is an explanatory diagram illustrating a data structure of transaction data.

Transaction data D1 illustrated in FIG. 6B is an example of the first transaction data to the fourth transaction data. Transaction data D1 includes: address P1 indicating a holder; address P2 indicating a destination; and electronic signature P3 generated by providing a signature on the hash value of addresses P1 and P2 using a signature key of the holder. Note that address P1 is blank when transaction data is newly generated.

<Synchronizing Unit 214>

Synchronizing unit 214 synchronizes the blocks of the blockchain or the transaction data among the plurality of authentication servers (authentication servers 200a to 200c).

More specifically, when (i) the user's electronic signature included in the transaction data obtained from home 100a and (ii) the validity of the transaction data are verified successfully, synchronizing unit 214 transfers a copy of the transaction data to the other authentication servers 200b and 200c. The transaction data here means any one of the first transaction data to the third transaction data, and the user's electronic signature means either the electronic signature of the first user or the electronic signature of the second user.

The plurality of authentication servers 200a to 200c synchronize the transaction data of the blockchain in a peer-to-peer manner. Synchronizing unit 214 records the synchronized transaction data of the blockchain in recorder 216.

For example, when the validity of the first transaction data indicating a selling request or the validity of the second transaction data indicating a buying request is verified, synchronizing unit 214 transfers the first or second transaction data to the other authentication servers 200b and 200c. In addition, synchronizing unit 214 records the verified transaction data in recorder 216.

When synchronizing unit 214 receives the transaction data from the other authentication servers 200b and 200c, synchronizing unit 214 records the transaction data in recorder 216.

<Transaction Generator 215>

Transaction generator 215 compares the buying amount information and the accumulated power amount information to determine whether or not power is transmittable from the power accumulation equipment to the second power equipment. When power is transmittable from the power accumulation equipment to the second power equipment via the power line, transaction generator 215 requests the power accumulation equipment to transmit power to the second power equipment. Furthermore, transaction generator 215 generates third transaction data indicating a transaction matching result indicating transmission of accumulated power from the power accumulation equipment to the second power equipment.

In the present embodiment, transaction generator 215 searches for a match between the accumulation list recorded in recorder 216 and the buying request list to determine whether a home that has made a buying request can buy power. When transaction generator 215 determines that the home can buy power, transaction generator 215 requests management server 350, which manages accumulator battery 300, to transmit power to the home that has made the buying request, generates transaction data, and records the transaction data in recorder 216.

FIG. 7A illustrates an example of the accumulation list according to the present embodiment. As illustrated in FIG. 7A, each row of the accumulation list includes a blockchain address, a date on which power was accumulated, the amount of power accumulated, and a signature. The accumulation list is recorded in recorder 216. For example, the first row of the accumulation list illustrated in FIG. 7A shows that a home identified by the blockchain address "0x03547921" accumulated power of "30 kWh" in accumulator battery 300 by "Dec. 14, 2017, 13:00". As described above, each row of the accumulation list indicates the amount of accumulated power transmitted by a home identified by a blockchain address, and a date on which the power was accumulated. As mentioned earlier, the blockchain addresses need not uniquely identify homes etc., and may be information that allows homes etc. to be distinguished from one another. In a precise sense, there is a time lag between a time at which power is transmitted and a time at which the power is received. Accordingly, the date need not include a precise time or the like, and is sufficient as long as the date can be accurately identified. Further, since there is also a transmission loss, the amount of power accumulated is not precisely equal to the amount of power transmitted. Accordingly, the amount of power accumulated may be treated as equal to the amount of power transmitted if the amount of power accumulated is within a predetermined range that takes the transmission loss into account.

FIG. 7B illustrates an example of the buying request list according to the present embodiment. As illustrated in FIG. 7B, each row of the buying request list includes a blockchain address, a date on which the user wants to buy power, the amount of power that the user wants to buy, the unit price for buying power, and a signature. For example, the first row of the buying request list in FIG. 7B shows that a home identified by the blockchain address "0x04587463" wants to buy power in an amount of "10 kWh" at the unit price of "20 yen" at around "Dec. 15, 2017, 13:30". In such a manner, each row of the buying request list shows an amount of power that a home identified by a blockchain address wants to buy, and also shows the date and time as well as the unit price at which the home wants to buy the power.

Note that the signatures provided by authentication server 200a and illustrated in FIG. 7A and FIG. 7B are not mandatory, and may be omitted.

Accordingly, transaction generator 215 searches for a match by referring to and making a comparison between the date and the amount of power indicated in the accumulation list illustrated in FIG. 7A, for example, and the date and the amount of power indicated in the buying request list illustrated in FIG. 7B, for example, to determine whether power is transmittable to a home that has made a buying request.

When transaction generator 215 determines that power is transmittable as desired by the home that has made the buying request, transaction generator 215 generates transaction data indicating the transaction matching result. Here, the transaction data indicating the transaction matching result includes the blockchain address of destination of the power, the date, the amount of power, and the unit price. Furthermore, transaction generator 215 requests management server 350, which manages accumulator battery 300, to transmit power to the home that has made the buying request. Transaction generator 215 then records the generated transaction data in recorder 216. Note that although transaction generator 215 requests management server 350 to transmit power to the home that has made the buying request, priority may be given to a home that has made a buying request with a higher unit price.

FIG. 8 illustrates an example of the buying list according to the present embodiment. The buying list illustrated in FIG. 8 is the result of transaction matching performed by transaction generator 215, and is an example of a power transaction list indicating when power was sold to who in what amount. As illustrated in FIG. 8, each row of the buying list includes a buyer blockchain address, a date, an amount of power, and a unit price. Note that although the buying list further includes the signature of the authentication server, it is not illustrated in FIG. 8. As described above, each row of the buying list includes: the buyer blockchain address indicating a home whose request to buy power has been matched in the transaction matching; the amount of power bought and sold in the power transaction; and the unit price of the power.

Transaction generator 215 generates transaction data indicating a transaction matching result including the information indicated in a row of the buying list in FIG. 8, and records the transaction data in recorder 216. After generating the transaction data indicating the transaction matching result, transaction generator 215 transmits a transaction result indicating the details of the transaction to homes 100a etc. conducting a power transaction, that is, homes buying and selling power. Note that transaction generator 215 may periodically broadcast the transaction result. Alternatively, when the homes conducting the power transaction can be identified by blockchain addresses, transaction generator 215 may directly transmit the transaction result to the homes.

After transaction generator 215 records a block including the first transaction data in the distributed ledger, and after the first authentication server pays an incentive to the first user, transaction generator 215 may transmit a notification indicating that the incentive has been paid. In the present embodiment, transaction generator 215 pays an incentive to home 100a that has transmitted power. After the incentive is paid, transaction generator 215 notifies home 100a which transmitted power that the incentive has been paid. Transaction generator 215 may prompt payment of the incentive by transmitting a power transaction result indicating the details of the power transaction to homes 100a etc. buying and selling power.

Note that the incentive may be paid by money remittance, may be paid in power transaction points, or may be paid in virtual currency using blockchain. With this, an incentive is paid also to home 100a etc. that transmitted the power bought. After the incentive is paid to home 100a etc. that transmitted the power bought, transaction generator 215 may transmit a notification to home 100a etc. that transmitted the power bought, indicating that the incentive has been paid.

<Recorder 216>

Recorder 216 records the transaction data of the blockchain in storage device 201a in units of blocks. Storage device 201a may be provided inside recorder 216, or may be provided outside authentication server 200a as illustrated in FIG. 1. The transaction data means first transaction data indicating a selling request, second transaction data indicating a buying request, or third transaction data indicating a transaction matching result.

<Communication Unit 217>

Communication unit 217 communicates with two or more homes 100a etc., the other authentication servers 200b and 200c, and management server 350. More specifically, communication unit 217 is a communication interface for communication with two or more homes 100a etc., the other authentication servers 200b and 200c, and management server 350. Communication with two or more homes 100a etc. and management server 350 may be performed in accordance with TLS. In this case, communication unit 217 may hold an encryption key for the TLS communication.

[1.5 Configuration of Management Server 350]

Figure 9:
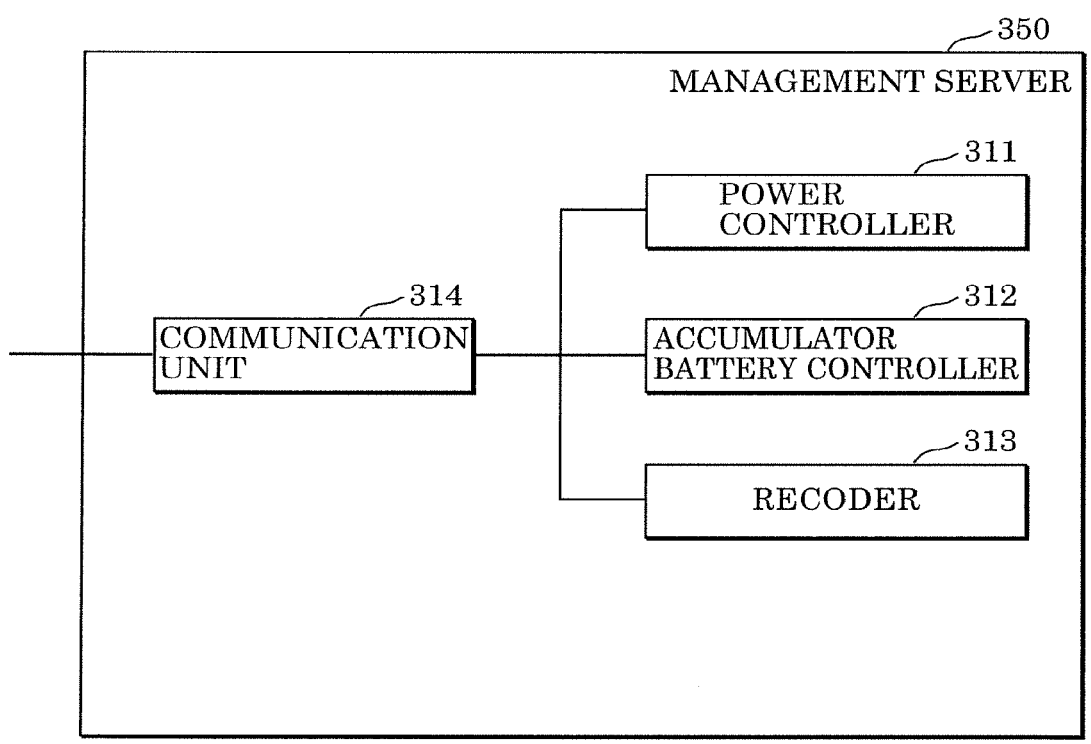
FIG. 9 is a block diagram illustrating a functional configuration of a management server according to the embodiment.

FIG. 9 is a block diagram illustrating a functional configuration of management server 350 according to the present embodiment. As illustrated in FIG. 9, management server 350 includes power controller 311, accumulator battery controller 312, recorder 313, and communication unit 314, and manages accumulator battery 300. Accumulator battery 300 and management server 350 are an example of the power accumulation equipment, and is hereinafter also referred to as an accumulator battery side.

<Power Controller 311>

Power controller 311 records, in recorder 313, as the amount of power received, the amount of power transmitted from home 100a etc. and accumulated in accumulator battery 300 according to an instruction from power controller 311 to accumulator battery controller 312. When power controller 311 obtains a power transmission request from authentication server 200a etc., power controller 311 instructs accumulator battery controller 312 to control accumulator battery 300 so that accumulator battery 300 transmits power accumulated in accumulator battery 300 to home 100a etc. indicated as the destination of power in the power transmission request.

When power controller 311 obtains an inquiry about the accumulation state of accumulator battery 300 from authentication server 200a etc., power controller 311 transmits the received power information including the amount of power received or the accumulated power information including the amount of power accumulated, which are recorded in recorder 313 as information indicating the accumulation state of accumulator battery 300. Here, as mentioned earlier, the received power information includes: received power amount information indicating the amount of received power received by the power accumulation equipment from the first power equipment; and the second time stamp indicating a second date and time of reception of the received power. That is to say, the received power information includes the received power amount information indicating the amount of the received power received from home 100a etc., and the date and time of reception of the received power. The accumulated power information includes the accumulated power amount information indicating the amount of accumulated power held by the power accumulation equipment. That is to say, the accumulated power information includes the accumulated power amount information indicating the current amount of power accumulated in accumulator battery 300.

<Accumulator Battery Controller 312>

When accumulator battery controller 312 obtains the instruction from power controller 311, accumulator battery controller 312 controls accumulator battery 300. For example, accumulator battery controller 312 controls accumulator battery 300 so that accumulator battery 300 transmits power accumulated in accumulator battery 300 to home 100a etc. indicated as the destination of the power in the power transmission request. Accumulator battery controller 312 controls accumulator battery 300 so that accumulator battery 300 transmits power accumulated in accumulator battery 300 to home 100a etc. indicated as the destination of the power in the power transmission request. Accumulator battery controller 312 obtains, from accumulator battery 300, either the received power information including the amount of power received or the accumulated power information including the amount of power accumulated, as information indicating the accumulation state of accumulator battery 300.

<Recorder 313>

Recorder 313 records the information indicating the accumulation state of accumulator battery 300 obtained from accumulator battery 300. In the present embodiment, recorder 313 records the received power information or the accumulated power information obtained from accumulator battery 300.

<Communication Unit 314>

Communication unit 314 communicates with home 100a etc. and authentication server 200a etc. via communication network 400. The communication may be performed in accordance with TLS. In this case, communication unit 314 may hold an encryption key for the TLS communication.

Note that management server 350 need not be included in power transaction system 10. In this case, among the functional elements of management server 350 described above, accumulator battery controller 312 may be included in authentication server 200a etc., and power controller 311, recorder 313, and communication unit 314 may be included in accumulator battery 300. Authentication server 200a etc. and accumulator battery 300 may directly communicate with each other without management server 350 in between. Note that in this case, accumulator battery 300 is an example of the power accumulation equipment.

[1.6 Overall Sequence of Power Transaction Between Homes and Authentication Servers]

Figure 10:
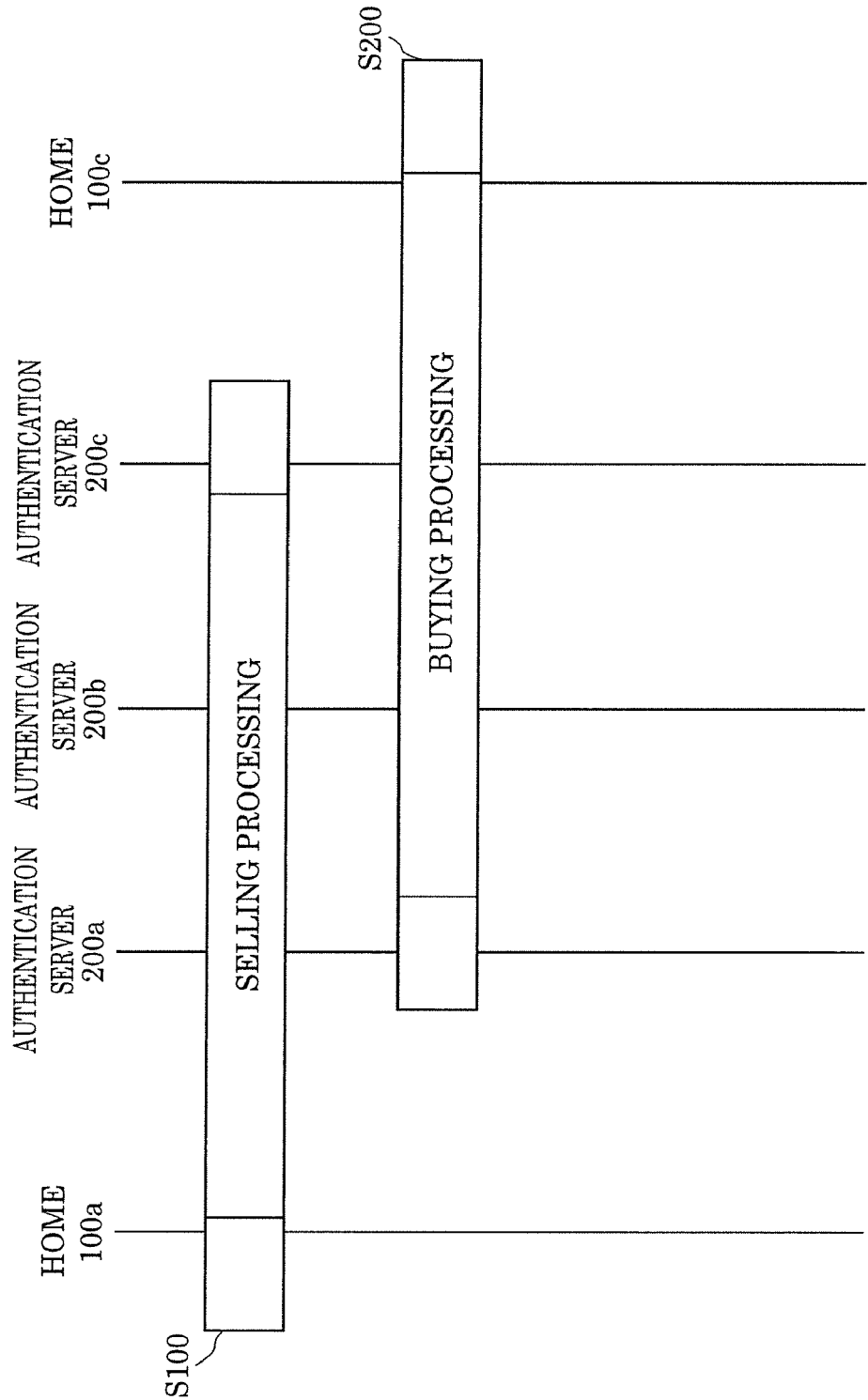
FIG. 10 is a sequence diagram illustrating an overall power transaction according to the embodiment.

Next, a sequence of a power transaction between homes 100a etc. and authentication servers 200a etc. will be described. FIG. 10 is a sequence diagram illustrating an overall power transaction according to the present embodiment. Each process will be described below.

First, in Step S100, selling processing is performed between, for example, home 100a and authentication servers 200a, 200b, and 200c. Subsequently, in Step S200, buying processing is performed between, for example, home 100c and authentication servers 200a, 200b, and 200c.

Note that any of the selling processing in Step S100 and the buying processing in Step S200 may be performed first, and both processing are performed irregularly.

[1.6.1 Selling Processing Performed Between Home and Authentication Servers]

Next, selling processing performed between home 100a etc. and authentication servers 200a etc. will be described.

Figure 11:
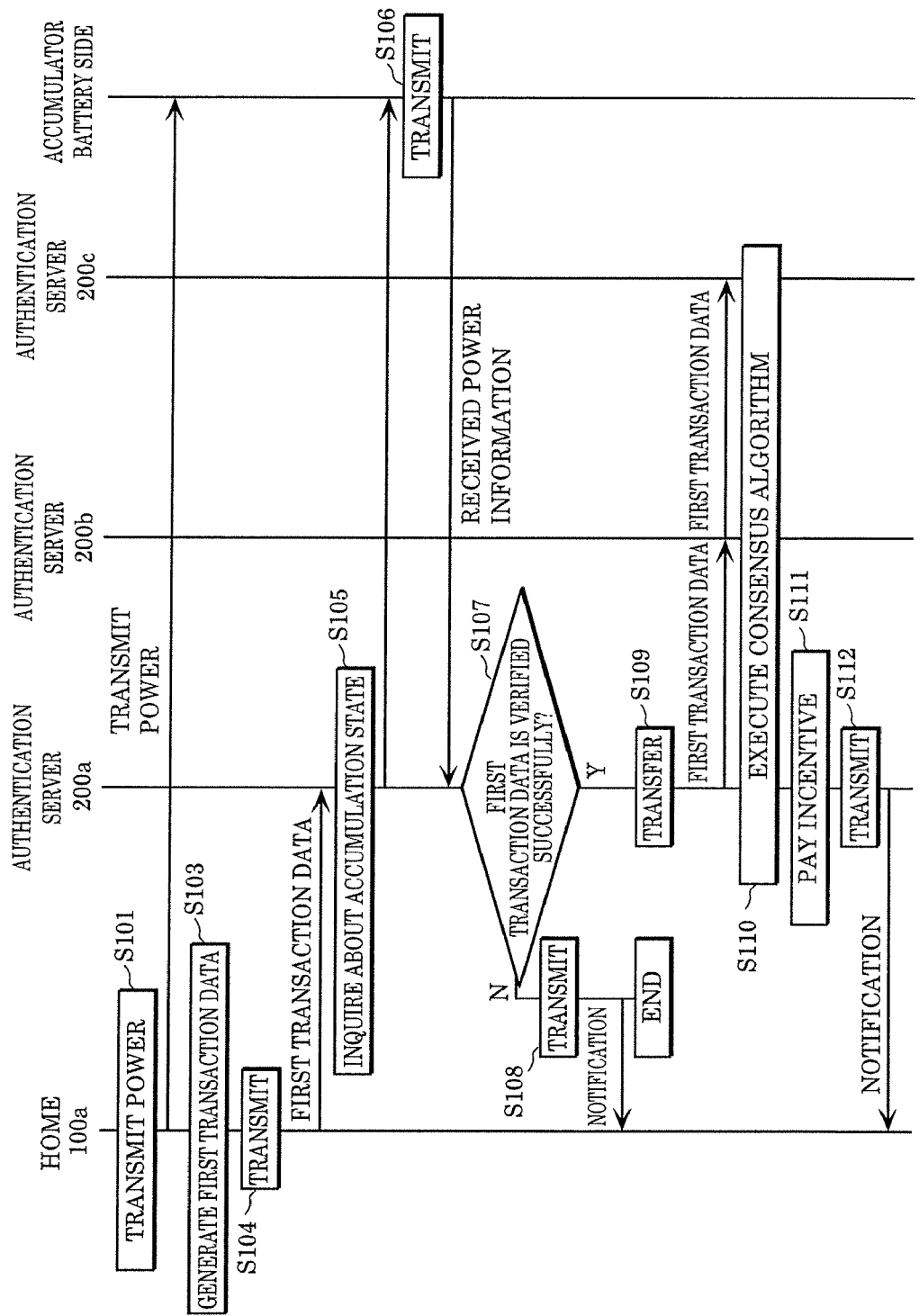
FIG. 11 is a sequence diagram illustrating selling processing according to the embodiment.

FIG. 11 is a sequence diagram illustrating selling processing according to the present embodiment. FIG. 11 illustrates an example in which home 100a sells power, but it may be a different home etc. that sells power. Even with a different home etc. such as home 100b, the same sequence is performed.

First, in Step S101, when controller 101 or the user of home 100a wants to sell surplus power generated by solar photovoltaic power generation equipment 102, controller 101 or the user of home 100a enters selling request information and transmits power. There may be a surplus of power when, for example, the amount of power used by home 100a is less than the amount of power generated by solar photovoltaic power generation equipment 102. In this case, the surplus power is transmitted to the accumulator battery side either after the user's selling request information is entered or automatically if a setting has been made in controller 101 to automatically transmit power. Note that, as mentioned earlier, the accumulator battery side means management server 350 that manages accumulator battery 300 when management server 350 is present, and means accumulator battery 300 when management server 350 is absent.

Next, in Step S103, controller 101 of home 100a generates transaction data indicating a selling request (hereinafter referred to as first transaction data) based on the selling request information entered. As described above, the first transaction data includes a blockchain address, a date, a selling amount, and a signature.

Next, in Step S104, controller 101 of home 100a transmits the generated first transaction data to authentication server 200a. Although controller 101 of home 100a transmits the generated first transaction data to authentication server 200a in the example illustrated in FIG. 11, controller 101 may transmit the generated first transaction data to the other authentication servers 200b and 200c. Even when controller 101 transmits the generated first transaction data to the other authentication servers 200b and 200c, the same processing is performed.

Next, in Step S105, when authentication server 200a receives the first transaction data from home 100a, authentication server 200a first makes an inquiry about the accumulation state of accumulator battery 300.

Next, in Step S106, in response to the inquiry about the accumulation state of accumulator battery 300, the accumulator battery side transmits received power information including received power amount information indicating the amount of received power received by accumulator battery 300 from home 100a.

Next, in Step S107, when authentication server 200a receives the received power information from the accumulator battery side, authentication server 200a verifies the first transaction data received from home 100a. Note that, as described above, the verification of the first transaction data includes at least verification of the validity of the first transaction data and verification of whether power information is valid, e.g., whether power has been properly transmitted and received.

When the first transaction data is not verified successfully in Step S107 (N in S107), authentication server 200a transmits a notification to home 100a indicating that the first transaction data is not verified successfully (S108), and ends the processing.

On the other hand, when the first transaction data is verified successfully in Step S107 (Y in S107), authentication server 200a transfers the first transaction data to the other authentication servers 200b and 200c (S109). The other authentication servers 200b and 200c also verify the first transaction data in the same manner.

Next, in Step S110, authentication servers 200a, 200b, and 200c execute a consensus algorithm. When authentication servers 200a, 200b, and 200c verify that the first transaction data is valid transaction data (that is, verify the validity of the first transaction data), each of authentication servers 200a, 200b, and 200c generates a block including the first transaction data. Then, authentication servers 200a, 200b, and 200c record the blocks including the first transaction data in the distributed ledgers of storage devices 201a, 201b, and 201c, respectively.

Next, in Step S111, authentication server 200a pays an incentive to home 100a that transmitted power. Note that the incentive may be paid by money remittance, may be paid in power transaction points, or may be paid in virtual currency using blockchain.

Next, in Step S112, authentication server 200a transmits a notification to home 100a that transmitted power, indicating that the incentive has been paid.

[1.6.2 Buying Processing Performed Between Home and Authentication Servers]

Figure 12:
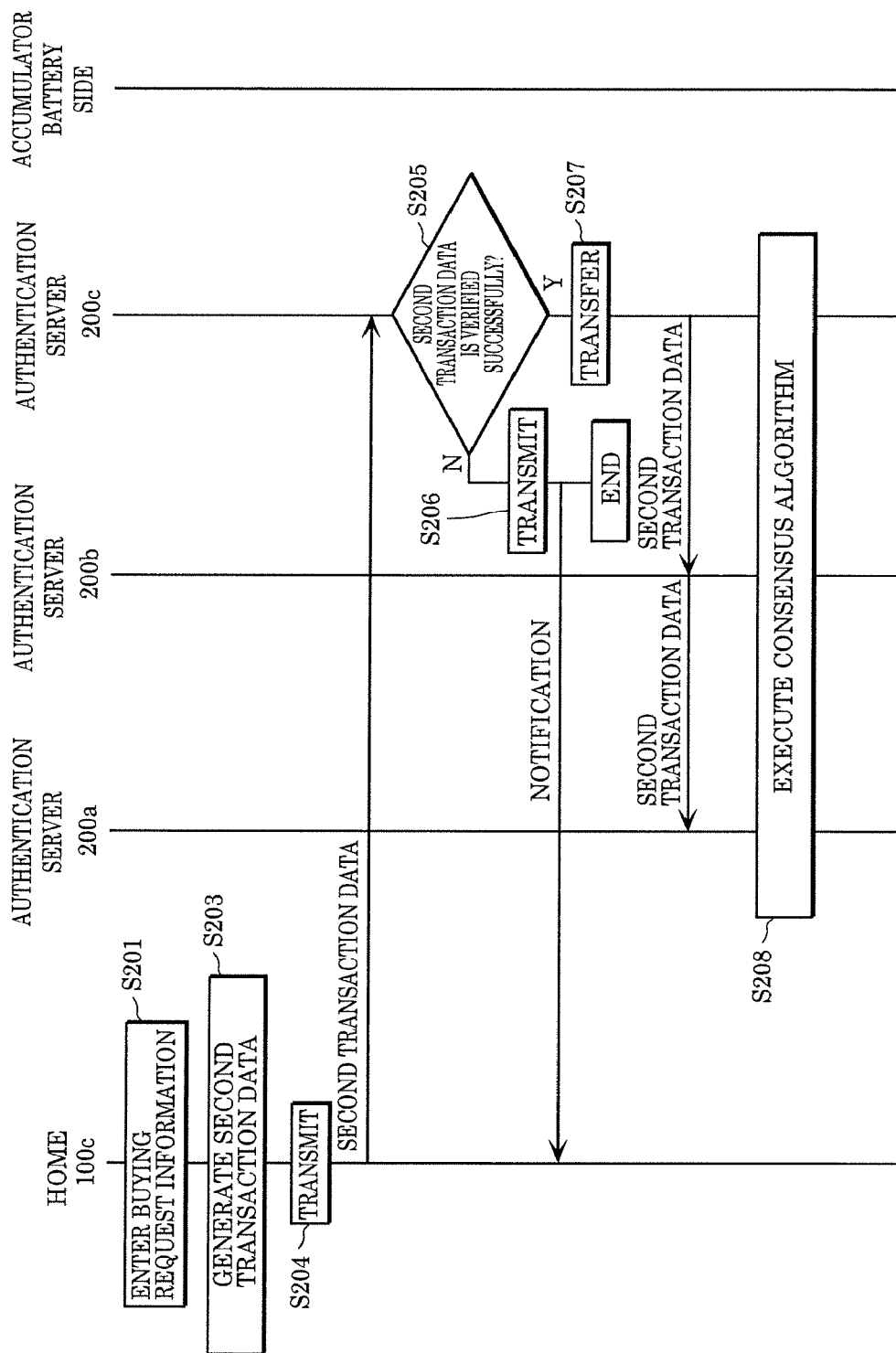
FIG. 12 is a sequence diagram illustrating buying processing according to the embodiment.
Figure 13:
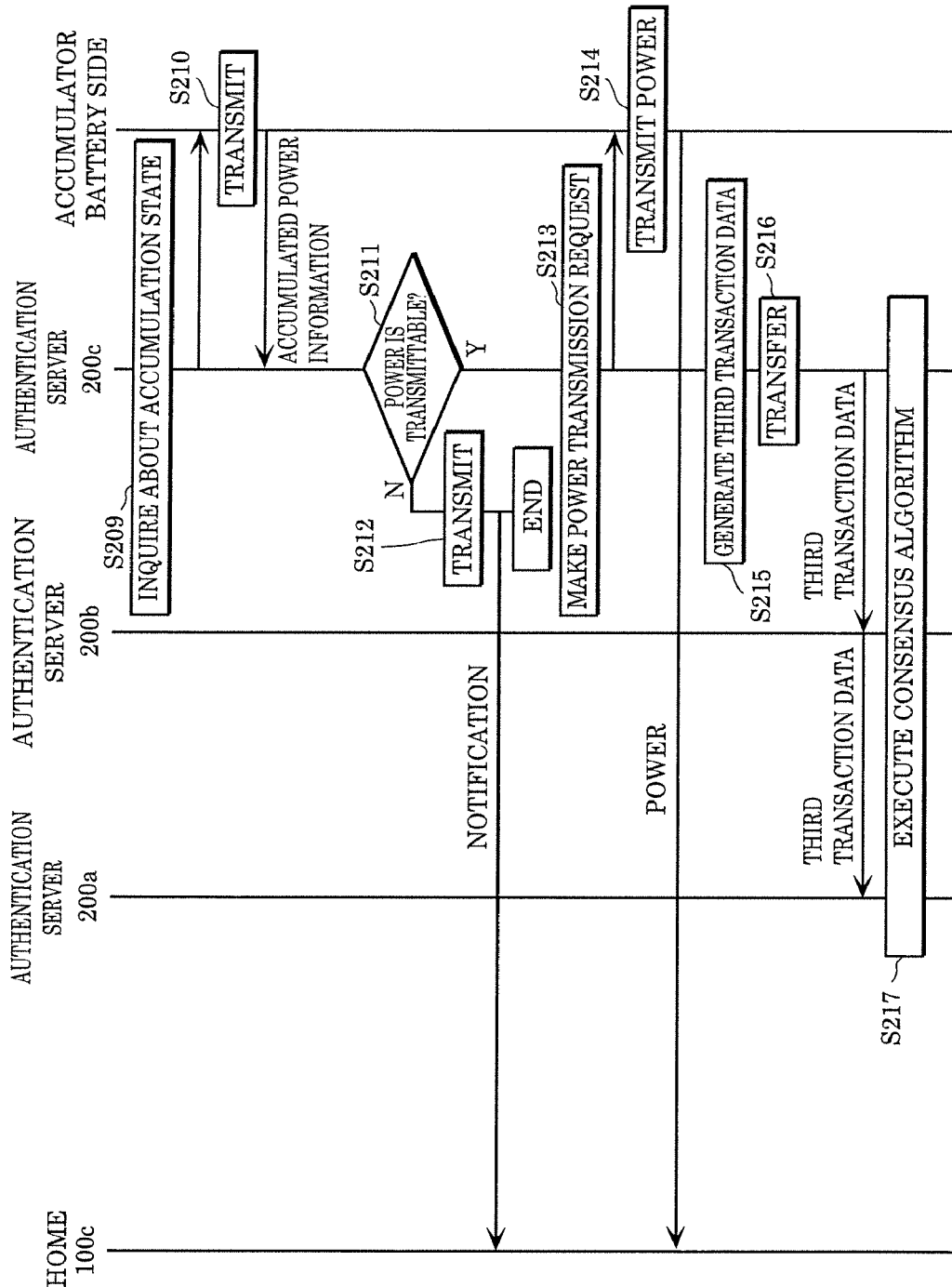
FIG. 13 is a sequence diagram illustrating buying processing according to the embodiment.

Next, buying processing performed between home 100c etc. and authentication servers 200a etc. will be described. FIG. 12 and FIG. 13 are sequence diagrams illustrating the buying processing according to the present embodiment. FIG. 12 and FIG. 13 illustrate an example in which home 100c buys power, but the present disclosure is not limited to this example. Even when a different home such as home 100b buys power, the same sequence of buying processing is performed.

First, in Step S201, when controller 101 or the user of home 100c wants to buy power, controller 101 or the user of home 100c enters buying request information. Controller 101 or the user of home 100c buys power when, for example, home 100c makes heavy use of power and it is cheaper to buy, from a service provider having accumulator battery 300, surplus power accumulated in accumulator battery 300 than to buy power from an electric utility company.

Next, in Step S203, controller 101 of home 100c generates transaction data indicating a buying request (hereinafter referred to as second transaction data) based on the buying request information entered. As described above, the second transaction data includes a blockchain address, buying amount information indicating the amount of power that home 100c wants to buy, and an electronic signature of the user of home 100c.

Next, in Step S204, controller 101 of home 100c transmits the generated second transaction data to authentication server 200c. Although controller 101 of home 100c transmits the generated second transaction data to authentication server 200c in the example illustrated in FIG. 12, controller 101 may transmit the generated second transaction data to the other authentication servers 200a and 200b. Even when controller 101 transmits the generated second transaction data to the other authentication servers 200a and 200b, the same processing is performed.

Next, in Step S205, authentication server 200c verifies the second transaction data received from home 100c.

When the second transaction data is not verified successfully in Step S205 (N in S205), authentication server 200c transmits a notification to home 100c indicating that the second transaction data is not verified successfully (S206), and ends the processing.

On the other hand, when the second transaction data is verified successfully in Step S205 (Y in S205), authentication server 200c transfers the second transaction data to the other authentication servers 200a and 200b (S207). The other authentication servers 200a and 200b also verify the second transaction data in the same manner.

Next, in Step S208, authentication servers 200a, 200b, and 200c execute a consensus algorithm. When authentication servers 200a, 200b, and 200c verify that the second transaction data is valid transaction data (that is, verify the validity of the second transaction data), each of authentication servers 200a, 200b, and 200c generates a block including the second transaction data. Then, authentication servers 200a, 200b, and 200c record the blocks including the second transaction data in the distributed ledgers of storage devices 201a, 201b, and 201c, respectively.

Next, as illustrated in FIG. 13, authentication server 200c makes an inquiry about the accumulation state of accumulator battery 300 in Step S209.

Next, in Step S210, in response to the inquiry about the accumulation state of accumulator battery 300, the accumulator battery side transmits accumulated power information indicating the amount of accumulated power that is currently held by accumulator battery 300.

Next, in Step S211, when authentication server 200c obtains the accumulated power information from the accumulator battery side, authentication server 200c determines, based on the obtained accumulated power information and the buying request list, whether or not power is transmittable to home 100c that has made a buying request. The accumulated power information indicates the accumulation state of accumulator battery 300. The buying request list indicates an amount of power that a home identified by a blockchain address wants to buy, and also indicates the date and time as well as the unit price at which the home wants to buy the power.

When authentication server 200c determines in Step S211 that power is not transmittable (N in S211), authentication server 200c transmits a notification to home 100c indicating that power is not transmittable (S212), and ends the processing.

On the other hand, when authentication server 200c determines in Step S211 that power is transmittable (Y in S211), authentication server 200c transmits a power transmission request to the accumulator battery side (S213). Note that authentication server 200c may transmit, in addition to the power transmission request, a reservation confirming notification to home 100c indicating that power is transmittable.

Next, in Step S214, when the accumulator battery side obtains the power transmission request from authentication server 200c, the accumulator battery side transmits the power accumulated in accumulator battery 300 to home 100c indicated as the destination of power in the power transmission request.

Next, in Step S215, authentication server 200c generates transaction data indicating a transaction matching result indicating transmission of accumulated power from the accumulator battery side to home 100c (hereinafter referred to as third transaction data). Note that authentication server 200c may generate the third transaction data after confirming that the accumulator battery side has transmitted the power to home 100c.

Next, in Step S216, authentication server 200c transfers the generated third transaction data to the other authentication servers 200a and 200b. The other authentication servers 200a and 200b also verify the third transaction data in the same manner.

Next, in Step S217, authentication servers 200a, 200b, and 200c execute a consensus algorithm. When authentication servers 200a, 200b, and 200c verify that the third transaction data is valid transaction data (that is, verify the validity of the third transaction data), each of authentication servers 200a, 200b, and 200c generates a block including the third transaction data. Then, authentication servers 200a, 200b, and 200c record the blocks including the third transaction data in the distributed ledgers of storage devices 201a, 201b, and 201c, respectively.

Note that when authentication server 200c transmits the power transmission request to the accumulator battery side in Step S213, authentication server 200c may generate transaction data (hereinafter referred to as third transaction data) indicating a transaction matching result indicating that the power accumulation equipment is requested to transmit accumulated power to the second power equipment. In this case, authentication server 200c transfers the generated third transaction data to the other authentication servers 200a and 200b. Next, authentication servers 200a, 200b, and 200c execute a consensus algorithm. When authentication servers 200a, 200b, and 200c verify that the third transaction data is valid transaction data (that is, verify the validity of the third transaction data), each of authentication servers 200a, 200b, and 200c generates a block including the third transaction data. Then, authentication servers 200a, 200b, and 200c record the blocks including the third transaction data in the distributed ledgers of storage devices 201a, 201b, and 201c, respectively.

Recording the blocks including the third transaction data in such a manner enables indication that reservation for power transmission is completed.

Moreover, in this case, as illustrated in Steps S214 to S217, when the transmission of power is completed in Step S214, fourth transaction data which further includes information indicating that the accumulator battery side has transmitted power may be further generated, and authentication servers 200a, 200b, and 200c may execute a consensus algorithm and record blocks including the fourth transaction data.

With this, the third transaction data indicating reservation for power transmission is generated and recorded in the distributed ledgers before generation of the fourth transaction data. This makes it possible to reliably leave the transaction matching result and the reservation for power transmission as evidence, even when there is a time lag between the time of transaction matching and the time of transmission of power.

[1.7 Advantageous Effects Etc.]

As described above, power transaction system 10 etc. according to the embodiment records, in a distributed ledger, transaction data indicating a power transaction such as transmission of power to accumulator battery 300. This makes public the transaction data indicating a power transaction, and makes tampering detectable. Accordingly, it is possible to reduce fraudulent power transactions by a service provider having an accumulator battery. For example, tampering can be detected since it is possible to verify, for example, the consistency between power transmitted to the power accumulation equipment and power received by the power accumulation equipment and the validity of the first transaction data.

Power transaction system 10 etc. according to the embodiment may record the second transaction data of the blockchain indicating the buying request in the distributed ledger. Power transaction system 10 etc. according to the embodiment may record, in the distributed ledger, the third transaction data for the blockchain indicating a transaction matching result related to a power transaction conducted via the accumulator battery. This makes public the transaction data indicating a power transaction, and makes tampering detectable. Accordingly, it is possible to reduce fraudulent power transactions by a service provider having accumulator battery 300.

As described above, when power transactions between individuals are put into the hands of an agent having accumulator battery 300, power transaction system 10 etc. according to the embodiment makes public the transaction data indicating the selling processing, the buying request processing, and the buying processing, using the blockchain technology. This prohibits the agent having accumulator battery 300 from: selling power at a unit price unreasonably higher than the price at which the agent bought the power; buying power at a price unreasonably cheaper than the average asking price; and refusing to sell power even though the agent has power accumulated. That is to say, since power transaction system 10 etc. according to the embodiment can ensure the transparency of the prices at which power transactions were conducted, it is possible to inhibit a service provider having accumulator battery 300 from fraudulent price manipulation at power transactions, and to reduce fraudulent power transactions.

Moreover, since the agent has accumulator battery 300, each home is not required to have an accumulator battery, and the user who wants to buy power simply has to send a request to the agent. This yields an advantageous effect that power transaction system 10 etc. according to the embodiment can be easily implemented.

[2. Other Variations]

Although the present disclosure has been described based on the above embodiment, the present disclosure is not limited to the above embodiment. Such cases as below are also encompassed by the present disclosure.

(1) Authentication server 200a etc. may generate transaction data and record the transaction data in storage device 201a etc. of authentication server 200a etc. when authentication server 200a etc. has paid the incentive. The transaction data may include: a blockchain address to which the incentive has been paid; information indicating the details of the incentive; and the signature of authentication server 200a etc.

(2) When a power transaction with a home that has made a buying request is not agreed upon, a buying request may be made again. This allows authentication server 200a etc. to re-set the time and/or unit price of power in the buying request, and determine again whether or not a power transaction is agreed upon.

(3) When the user buys power as a result of making a buying request, the user may make the payment directly to a power transaction service company, or may make the payment in virtual currency or power transaction points obtained in the past by selling power.

(4) In the example illustrated in FIG. 11 according to the embodiment, authentication server 200a pays an incentive to the user of home 100a that has sold power, after the power has been sold to the accumulator battery side. The present disclosure, however, is not limited to this example. Authentication server 200a may pay an incentive to the user of home 100a that has sold the power, after the payment by the user of home 100c that has bought the power is finished. Authentication server 200a may periodically make collective payment to the user of home 100a that has sold power, rather than paying for each selling transaction.

(5) In the above embodiment, whether to transmit power is determined by authentication server 200a etc., but the present disclosure is not limited to this. Authentication server 200a may implement in advance a program for determining whether a power transaction is agreed upon, e.g., whether power is transmittable, so that determination regarding a power transaction can be automatically made using a smart contract function of a blockchain.

(6) In the above embodiment, the unit price for buying power is entered by the user, but the present disclosure is not limited to this. Authentication server 200a etc. may set a unit price for selling power and/or a unit price for buying power, and the user may make a selection. The unit price for selling power and the unit price for buying power may be changed depending on time.

(7) In the above embodiment, authentication server 200a etc. determines whether or not power is transmittable based on the amount of accumulated power, time, and unit price, but may determine whether or not power is transmittable based also on the easiness of power transmission in the power network. For example, in the case where a power transaction between homes is conducted via the power network, authentication server 200a etc. may give a priority to a closely located home in the transaction matching. In the transaction matching, authentication server 200a etc. may give a priority to a home with less power loss in transmission of power via the power network. This enables reduction of power loss in the power transaction service as a whole.

(8) Authentication server 200a etc. may issue a token as the right to use power of an accumulator battery, and the user of a home that wants to buy power may buy the token. With this, the user who wants to buy power can buy in advance the right to use power.

(9) When power is transmitted from a home to accumulator battery 300, management server 350 that manages accumulator battery 300 may generate transaction data including the date and the amount of power transmitted and accumulated. Management server 350 that manages accumulator battery 300 may generate transaction data including the date and the amount of power transmitted also when power is transmitted from accumulator battery 300 to a home. The generated transaction data may be managed in a blockchain as a result of management server 350 transmitting the generated transaction data to authentication server 200a etc.

(10) In the above embodiment, authentication server 200a etc. determines whether or not power is transmittable based on the accumulated power information and the buying request information. When authentication server 200*a* etc. determines that power is not transmittable, authentication server 200*a* etc. may transmit to each home a notification prompting the home to make a selling request again. In the selling request transmitted after the notification, the unit price for selling power may be higher. This can increase the amount of power accumulated in accumulator battery 300, enabling transmission of power to a home.

(11) Management server 350 may transmit the accumulated power information to authentication server 200*a* etc. on a regular basis or when the accumulation state of accumulator battery 300 has changed. At this time, management server 350 may generate transaction data including the accumulation state and date, and transmit the transaction data to authentication server 200*a* etc.

(12) The selling price and/or buying price may be set depending on the accumulation state of accumulator battery 300.

(13) In addition, the present disclosure encompasses a data structure used for a block recorded in a blockchain in power transaction system 10 according to the above embodiment. More specifically, a data structure according to the present disclosure is a data structure data structure used for a block recorded in a blockchain in a power transaction system that includes: first power equipment used by a first user; power accumulation equipment connected to the first power equipment via a power line; and a plurality of servers with which the first power equipment and the power accumulation equipment are capable of communicating via a network. The data structure includes: a blockchain address that is an identifier for identifying at least one of the first user and the first power equipment, the blockchain address being included in the block of the blockchain and generated using a secret key of the first user; transmitted power amount information indicating an amount of transmitted power transmitted by the first power equipment to the power accumulation equipment; and an electronic signature of the first user. The transmitted power amount information is used for verification of validity of a transaction related to transmission of the transmitted power from the first power equipment to the power accumulation equipment, by being compared with received power amount information indicating an amount of received power received by the power accumulation equipment from the first power equipment. Note that in some cases, the first transaction data includes the first time stamp, and the received power information includes the second time stamp. In such cases, use of the first time stamp and the second time stamp makes it possible to ensure that power has been transmitted to the accumulator battery and that the power has been transmitted and received at the same time.

(14) Each of the devices and apparatuses according to the above embodiment is, specifically, a computer system including a microprocessor, ROM (read-only memory), RAM (random-access memory), a hard disk unit, a display unit, a keyboard, a mouse, etc. A computer program is recorded in the RAM or the hard disk unit. Each of the devices achieves its function as a result of the microprocessor operating according to the computer program. Here, the computer program is configured by combining a plurality of instruction codes indicating instructions for the computer in order to achieve a given function.

(15) A portion or all of the structural elements of each of the devices and apparatuses according to the above embodiment may be configured from one system LSI (large-scale integration). A system LSI is a super-multifunction LSI manufactured with a plurality of components integrated on a single chip, and specifically is a computer system including a microprocessor, ROM, and RAM, for example. A computer program is recorded in the RAM. The system LSI achieves its function as a result of the microprocessor operating according to the computer program.

Each structural element of each of the devices and apparatuses described above may be implemented in a single chip individually, or in a single chip that includes some or all of them.

The name used here is system LSI, but it may also be called IC, LSI, super LSI, or ultra LSI depending on the degree of integration. Moreover, the method of circuit integration is not limited to LSI. Integration may be realized with a specialized circuit or a general purpose processor. After manufacturing the LSI circuit, a field programmable gate array (FPGA) or a reconfigurable processor that allows reconfiguration of the connection or setting of the inner circuit cells of the LSI circuit can be used.

Furthermore, when advancement in semiconductor technology or derivatives of other technologies brings forth a circuit integration technology which replaces LSI, it will be appreciated that such a circuit integration technology may be used to integrate the functional blocks. Application of biotechnology is one such possibility.

(16) A portion or all of the structural elements of each of the devices and apparatuses described above may each be configured as an IC card that is detachably attached to each device or apparatus, or as a stand-alone module. The IC card and the module are computer systems configured from a microprocessor, ROM, and RAM, for example. The IC card and the module may also include in the super-multifunction LSI described above. The IC card and the module achieve their function as a result of the microprocessor operating according to a computer program. The IC card and the module may be tamperproof.

(17) The present disclosure may be realized as the methods described above. The present disclosure may be a computer program realizing these methods using a computer, or a digital signal including the computer program.

Furthermore, the present disclosure may also be realized as the computer program or the digital signal recorded on a computer-readable recording medium such as a flexible disk, hard disk, CD-ROM, MO, DVD, DVD-ROM, DVD-RAM, a BD (Blu-ray Disc), or a semiconductor memory. The present disclosure may also be realized as the digital signal recorded on these recording media.

Moreover, the present disclosure may also be realized by transmitting the computer program or the digital signal via, for example, an electric communication line, a wireless or wired communication line, a network such as the Internet, or data broadcasting.

Moreover, the present disclosure may be realized as a computer system including (i) memory having the computer program recorded therein, and (ii) a microprocessor that operates according to the computer program.

Moreover, the computer program or the digital signal may be realized by an independent computer system by being recorded in the recording medium and transmitted, or by being transmitted via the network, for example.

(18) The above embodiment and variations may be individually combined.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The power transaction system according to the present disclosure enables power transactions while reducing fraudulent practices as a result of an authentication server managing transaction data indicating information on selling and buying of power and information on power transactions.

What is claimed is:

1. A control method performed in a power transaction system that includes: second power equipment used by a second user; power accumulation equipment connected to the second power equipment via a power line; and a plurality of servers with which the second power equipment and the power accumulation equipment are capable of communicating via a network, the control method being performed by a first server among the plurality of servers, comprising:
    receiving second transaction data from the second power equipment via the network, the second transaction data including (i) buying amount information indicating an amount of power that the second user wants to buy, and (ii) an electronic signature of the second user;
    obtaining accumulated power information from the power accumulation equipment via the network, the accumulated power information including accumulated power amount information indicating an amount of accumulated power held by the power accumulation equipment;
    determining, by using a smart contract, whether or not power is transmittable from the power accumulation equipment to the second power equipment by comparing the buying amount information and the accumulated power amount information;
    requesting the power accumulation equipment to transmit power to the second power equipment when power is transmittable from the power accumulation equipment to the second power equipment via the power line.

2. The control method according to claim 1, further comprising:
    verifying the second transaction data;
    transferring the second transaction data to a plurality of second servers among the plurality of servers not including the first server when (i) the electronic signature of the second user and (ii) validity of the second transaction data are verified successfully in verifying the second transaction data;
    executing a second consensus algorithm with the plurality of second servers for reaching a consensus on the validity of the second transaction data; and
    recording a block including the second transaction data in a distributed ledger when the consensus on the validity of the second transaction data is reached through the second consensus algorithm.

3. The control method according to claim 1, further comprising:
    generating third transaction data including information indicating that the power accumulation equipment has transmitted the accumulated power to the second power equipment;
    transferring the third transaction data to the plurality of second servers;
    executing a third consensus algorithm with the plurality of second servers for reaching a consensus on validity of the third transaction data; and
    recording a block including the third transaction data in the distributed ledger of the first server when the consensus on the validity of the third transaction data is reached through the third consensus algorithm.

4. The control method according to claim 1, wherein requesting the power accumulation equipment to transmit power to the second power equipment includes:
    generating fourth transaction data indicating a transaction matching result indicating that the power accumulation equipment has been requested to transmit accumulated power to the second power equipment;
    transferring the fourth transaction data to the plurality of second servers;
    executing a fourth consensus algorithm with the plurality of second servers for reaching a consensus on validity of the fourth transaction data; and
    recording a block including the fourth transaction data in the distributed ledger of the first server when the consensus on the validity of the fourth transaction data is reached through the fourth consensus algorithm.

5. The control method according to claim 1, wherein the second power equipment include at least one of a solar photovoltaic power generation apparatus, a gas power generation apparatus, and a wind power generation apparatus.

6. The control method according to claim 1, wherein executing the second consensus algorithm includes:
    receiving a second report from each of the plurality of second servers indicating whether or not the validity of the second transaction data is verified successfully;
    determining whether or not a total number of second reports indicating that the validity of the second transaction data is verified successfully exceeds a predetermined number; and
    determining that the consensus on the validity of the second transaction data is reached through the second consensus algorithm when the total number of second reports indicating that the validity of the second transaction data is verified successfully exceeds the predetermined number.

7. A power transaction system, comprising:
    second power equipment used by a second user and including a second controller;
    power accumulation equipment connected to the second power equipment via a power line and including a third controller; and
    a plurality of servers communicably connected to the second power equipment and the power accumulation equipment via a network, wherein
    the second controller included in the second power equipment:
        generates second transaction data including (i) buying amount information indicating an amount of power that the second user wants to buy, and (ii) an electronic signature of the second user; and
        transmits the second transaction data to a first server among the plurality of servers via the network,
    the third controller included in the power accumulation equipment:
        transmits accumulated power information including accumulated power amount information indicating an amount of accumulated power held by the power accumulation equipment,
    the first server:
        obtains the second transaction data and the accumulated power information via the network;

determines, based on a smart contract, whether or not power is transmittable from the power accumulation equipment to the second power equipment by comparing the buying amount information and the accumulated power amount information; and
requests the power accumulation equipment to transmit power to the second power equipment when power is transmittable from the power accumulation equipment to the second power equipment via the power line.

\* \* \* \* \*